(12) United States Patent
McAllister

(10) Patent No.: US 12,205,223 B2
(45) Date of Patent: Jan. 21, 2025

(54) BOUNDING VOLUME HIERARCHY LEAF NODE COMPRESSION

(71) Applicant: QUALCOMM Incorporated, San Diego, CA (US)

(72) Inventor: David Kirk McAllister, Holladay, UT (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/650,060

(22) Filed: Feb. 4, 2022

(65) Prior Publication Data

US 2023/0252725 A1 Aug. 10, 2023

(51) Int. Cl.
| | |
|---|---|
| *G06T 17/10* | (2006.01) |
| *G06T 9/00* | (2006.01) |
| *G06T 9/40* | (2006.01) |
| *G06T 15/06* | (2011.01) |
| *G06T 15/08* | (2011.01) |
| *G06T 15/80* | (2011.01) |

(52) U.S. Cl.
CPC .............. *G06T 17/10* (2013.01); *G06T 9/001* (2013.01); *G06T 9/40* (2013.01); *G06T 15/06* (2013.01); *G06T 15/08* (2013.01); *G06T 15/80* (2013.01); *G06T 2210/12* (2013.01)

(58) Field of Classification Search
None
See application file for complete search history.

(56) References Cited

U.S. PATENT DOCUMENTS

| | | |
|---|---|---|
| 2020/0211268 A1 | 7/2020 | Vaidyanathan et al. |
| 2021/0287431 A1 | 9/2021 | Woop et al. |
| 2022/0051476 A1* | 2/2022 | Woop .................... G06T 3/4007 |

OTHER PUBLICATIONS

International Search Report and Written Opinion—PCT/US2023/011170—ISA/EPO—May 2, 2023.

* cited by examiner

*Primary Examiner* — Nurun Flora
(74) *Attorney, Agent, or Firm* — Procopio, Cory, Hargreaves & Savitch

(57) ABSTRACT

Aspects presented herein relate to methods and devices for graphics processing including an apparatus, e.g., a GPU. The apparatus may configure a BVH structure including a plurality of nodes each including one or more primitives, and each of the primitives being associated with a primitive ID, a geometry ID, and a set of floating-point coordinates. The apparatus may also compress the primitive ID or the geometry ID for each of the primitives. Further, the apparatus may convert a binary representation of each of the floating-point coordinates into an integer value of each of the floating-point coordinates. The apparatus may also calculate a difference between the integer value of each of the set of floating-point coordinates for each of the plurality of primitives. The apparatus may also store the compressed primitive ID or the compressed geometry ID and the calculated difference.

28 Claims, 14 Drawing Sheets

BOUNDING VOLUME HIERARCHY LEAF NODE COMPRESSION

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node compression techniques in graphics processing may not efficiently compress leaf nodes. Accordingly, there has developed an increased need for improved node compression techniques to efficiently compress leaf nodes.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may configure a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with a primitive identifier (ID), a geometry ID, and a set of floating-point coordinates. The apparatus may also compress at least one of the primitive ID or the geometry ID for each of the plurality of primitives. Additionally, the apparatus may convert a binary representation of each of the set of floating-point coordinates for each of the plurality of primitives into an integer value of each of the set of floating-point coordinates for each of the plurality of primitives. The apparatus may also calculate a difference between the integer value of each of the set of floating-point coordinates for each of the plurality of primitives. The apparatus may also modify the difference between the integer value of each of the set of floating-point coordinates for each of the plurality of primitives. Moreover, the apparatus may store at least one of the compressed primitive ID or the compressed geometry ID for each of the plurality of primitives and the calculated difference between the integer value of each of the set of floating-point coordinates.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
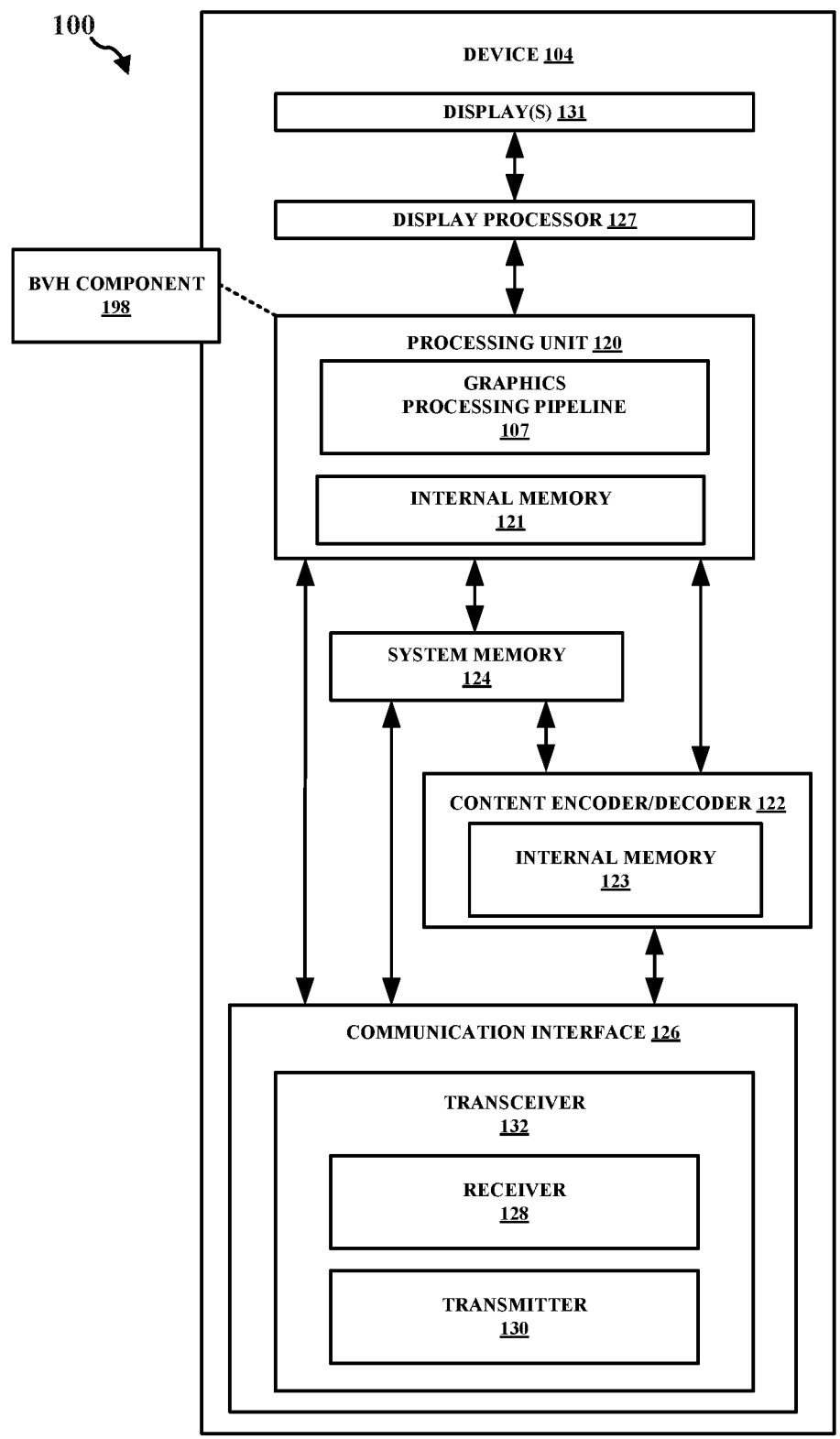
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

In some aspects of ray tracing, leaf nodes may contain information concerning the actual primitives which make up the geometry of a scene. Leaf nodes may contain index and vertex buffers for each of these primitives. However, the leaf nodes may not contain the primitives themselves (i.e., per vertex primitive coordinates may not be stored in leaf nodes). For instance, storing a copy of the primitives in the leaf nodes may be an expensive proposition if there are different types of primitives allowed by an application program interface (API). In some instances, without compression, one primitive/triangle may fit in a leaf node. Indeed, without compression, four triangles stored in one leaf node may have to be stored as four individual leaf nodes, plus an additional internal node to connect them. Further, without leaf node compression, a ray tracing unit (RTU) may be faced with: a higher number of traversal loop iterations (i.e., hops) to trace a ray, higher memory bandwidth consumption to fetch a separate node for each triangle (plus more internal nodes), and higher power consumption to fetch and process additional nodes. In addition, the process of determining the number of primitives per leaf node may be a complex task. In some instances, these steps may include negative consequences, such as leaf node bloating (i.e., increasing of the size of leaf nodes), which is not optimal for leaf node compression. Aspects of the present disclosure may utilize an efficient leaf node compression algorithm to store a copy of primitives in leaf nodes. Aspects of the present disclosure may also efficiently determine the number of primitives per leaf node. For instance, aspects of the present disclosure may include a lossless compression mechanism to handle the compression of leaf nodes, where leaf nodes may store a copy of primitives (i.e., floating-point coordinates or floating point coordinates). Also, each of the leaf nodes may contain a number of primitives (e.g., 1, 2, 3, or 4 primitives). Aspects of the present disclosure may utilize a combination of arithmetic compression techniques, i.e., techniques that involve performing reversible math operations on the vertices of primitives and storing the result in a number of bits. This type of compression may compress up to a certain number of primitives/triangles (e.g., 3 or 4 primitives/triangles) into a certain number of bytes (e.g., 64 bytes). In some instances, aspects presented herein may utilize a leaf node compression algorithm. For instance, aspects presented herein may include the ability to store triangle geometry within a BVH data structure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of other components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH component 198 configured to obtain a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with a primitive identifier (ID), a geometry ID, and a set of floating-point coordinates. Geometry data may include data associated with geometric primitives in a scene or frame that is processed in the graphics pipeline, e.g., draw call data, programming data, constant data, content register data, etc. A scene may be one or more frames including a set of objects/primitives for processing or rendering in the graphics pipeline. For example, a scene may include a series of frames that include similar objects or primitives. The BVH component 198 may also be configured to compress at least one of the primitive ID or the geometry ID for each of the plurality of primitives. The BVH component 198 may also be configured to convert a binary representation of each of the set of floating-point coordinates for each of the plurality of primitives into an integer value of each of the set of floating-point coordinates for each of the plurality of primitives. The BVH component 198 may also be configured to calculate a difference between the integer value of each of the set of floating-point coordinates for each of the plurality of primitives. The BVH component 198 may also be configured to modify the difference between the integer value of each of the set of floating-point coordinates for each of the plurality of primitives. The BVH component 198 may also be configured to store at least one of the compressed primitive ID or the compressed geometry ID for each of the plurality of primitives and the calculated difference between the integer value of each of the set of floating-point coordinates. The BVH component 198 may also be configured to retrieve at least one of the compressed primitive ID, the compressed geometry ID, or the calculated difference after storing at least one of the compressed primitive ID, the compressed geometry ID, or the calculated difference. The BVH component 198 may also be configured to perform a ray intersection for at least one of the plurality of nodes after retrieving at least one of the compressed primitive ID, the compressed geometry ID, or the calculated difference. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher, a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a vertex fetcher, may use these states to determine certain functions, e.g., how a vertex is assembled. As these modes or states may change, GPUs may need to change the corresponding context. Additionally, the workload that corresponds to the mode or state may follow the changing mode or state.

Figure 2:
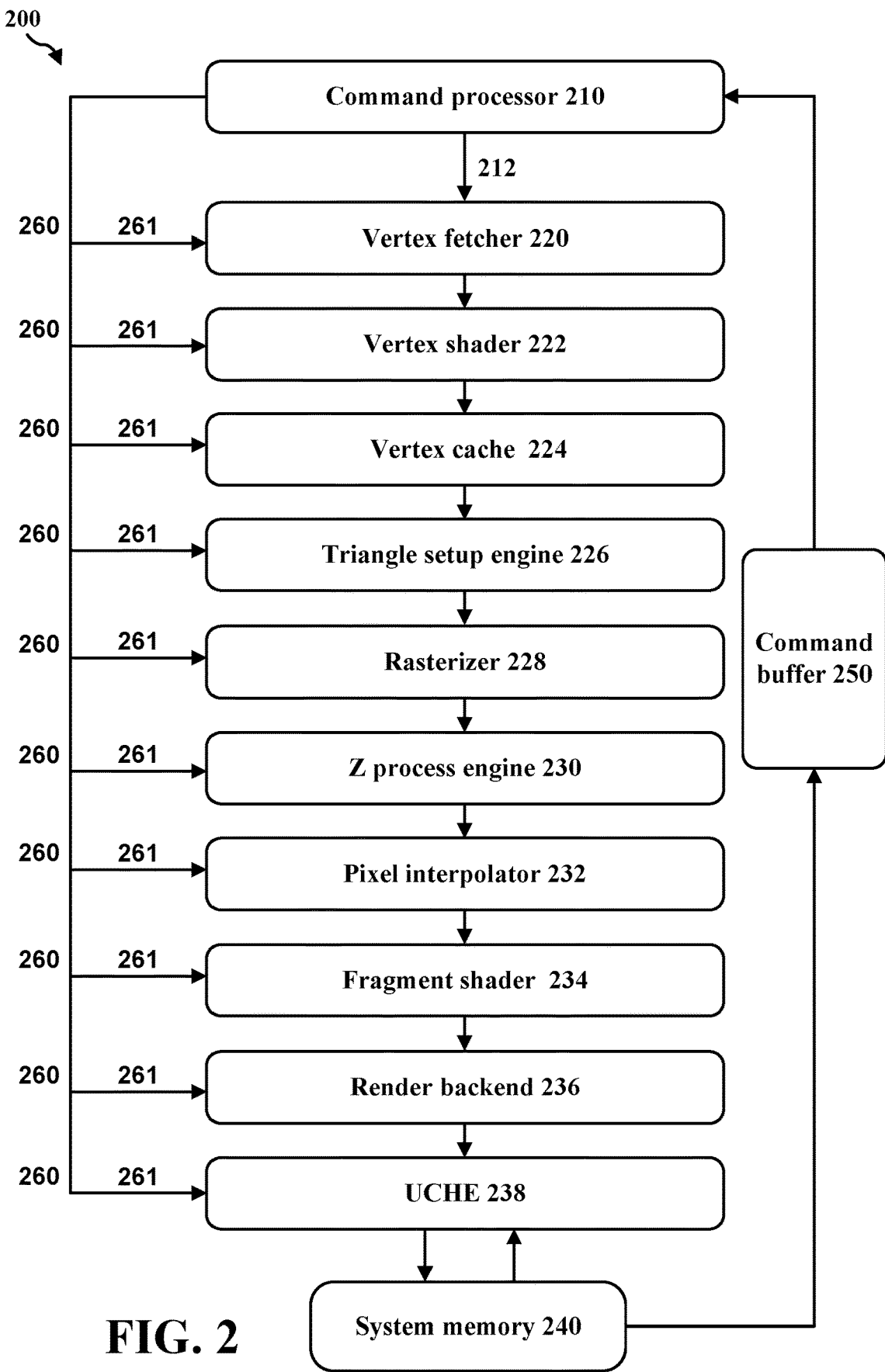
FIG. 2 is an example graphics processing unit (GPU) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, vertex fetcher 220, VS 222, vertex cache (VPC) 224, triangle setup engine 226, rasterizer 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
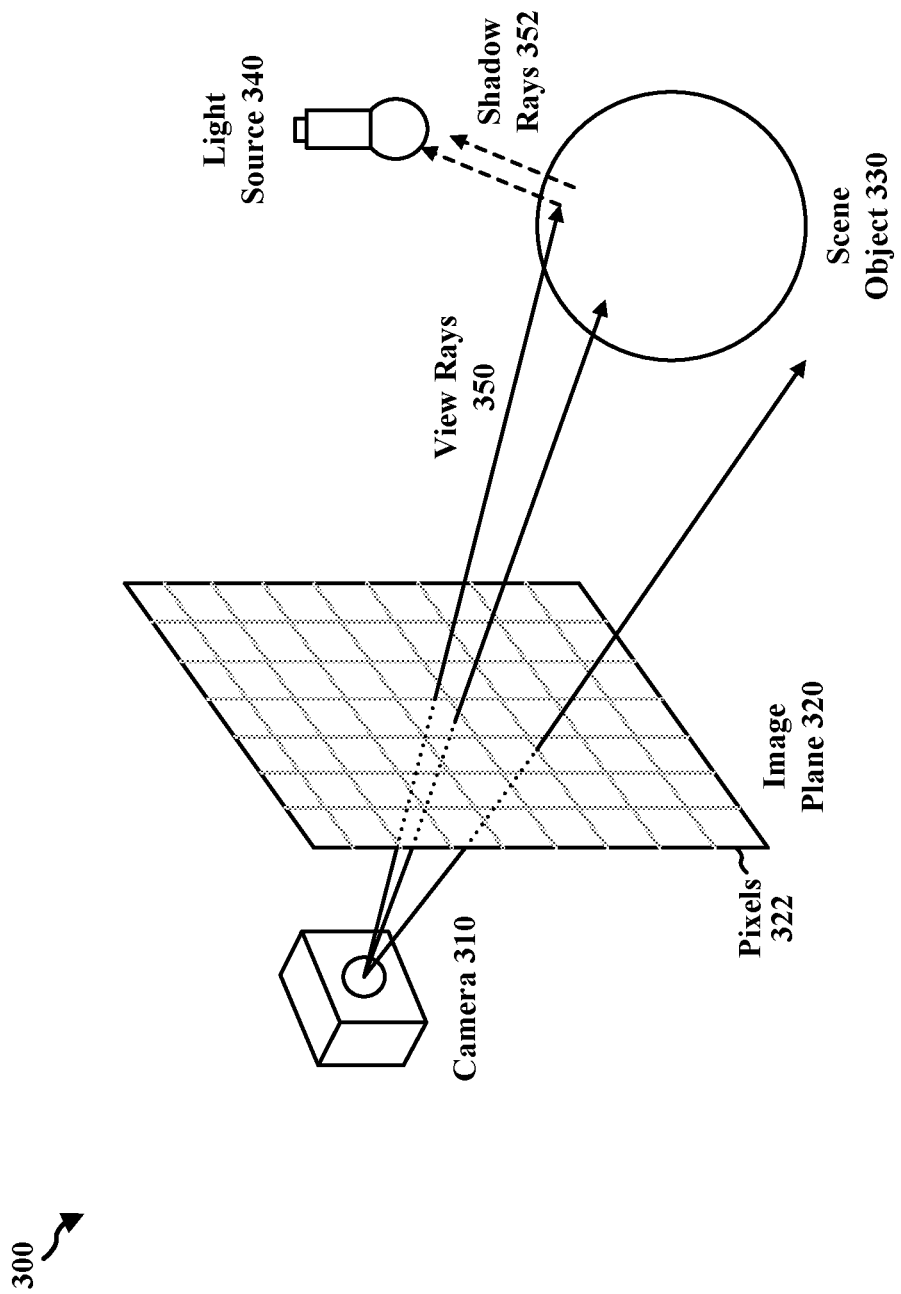
FIG. 3 is a diagram illustrating an example ray tracing process in accordance with one or more techniques of this disclosure.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or intersect a certain primitive, then the pixel is shaded. In some instances of graphics processing, ray tracing algorithms may be performed alongside rasterization, such as via a hybrid ray tracing/rasterization model.

Figures 4A, 4B:
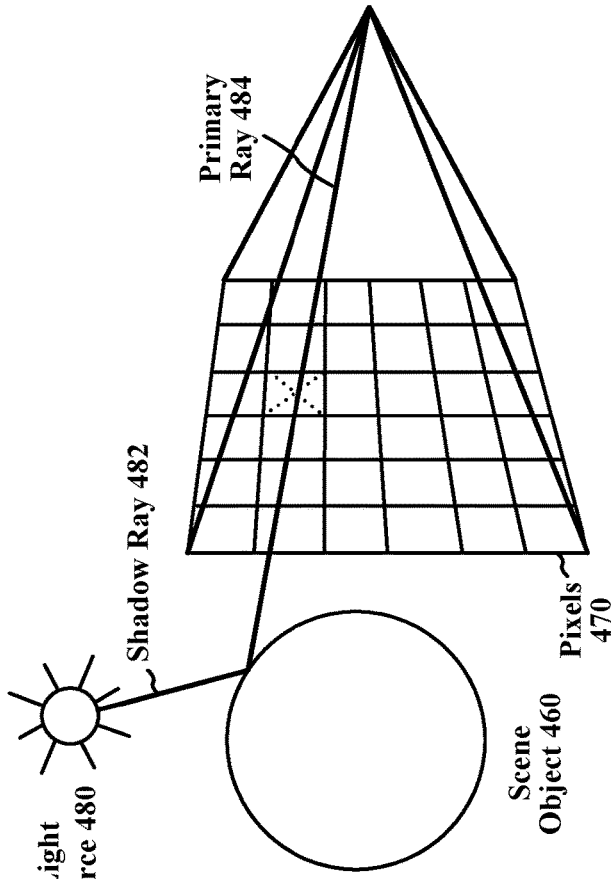
FIG. 4A is a diagram illustrating an example rasterization process in accordance with one or more techniques of this disclosure.
FIG. 4B is a diagram illustrating an example ray tracing process in accordance with one or more techniques of this disclosure.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or intersect a certain primitive in scene object 460 corresponding to one of the pixels 470 via primary ray 484, then the pixel is shaded.

As indicated herein, the process of ray tracing may be performed by determining whether a ray will hit/intersect any primitive(s) in a scene. For example, ray tracing algorithms may perform a simple query operation: Is a given ray going to hit/intersect any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to intersect primitives in a scene ($t_{min}$), a maximum time to intersect primitives in a scene ($t_{max}$), and a calculated distance to intersect primitives in the scene.

Figure 5:
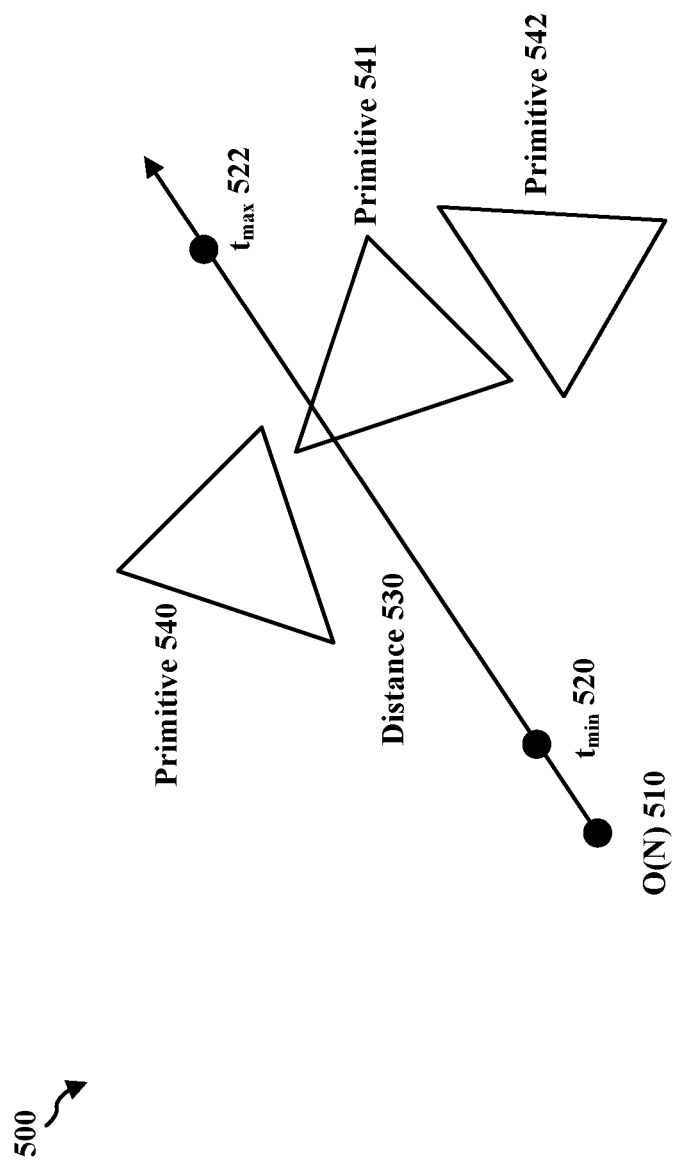
FIG. 5 is a diagram illustrating an example ray tracing process in accordance with one or more techniques of this disclosure.

FIG. 5 illustrates diagram 500 including one example of a ray tracing process. As shown in FIG. 5, diagram 500 includes origin point for a ray (O(N) 510), a minimum time to intersect primitives in a scene ($t_{min}$ 520), a maximum time to intersect primitives in a scene ($t_{max}$ 522), a calculated distance to intersect primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will intersect a primitive, ray tracing techniques may utilize an origin point for a ray (O(N) 510), a minimum time to intersect primitives ($t_{min}$ 520), a maximum time to intersect primitives ($t_{max}$ 522), a calculated distance to intersect primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
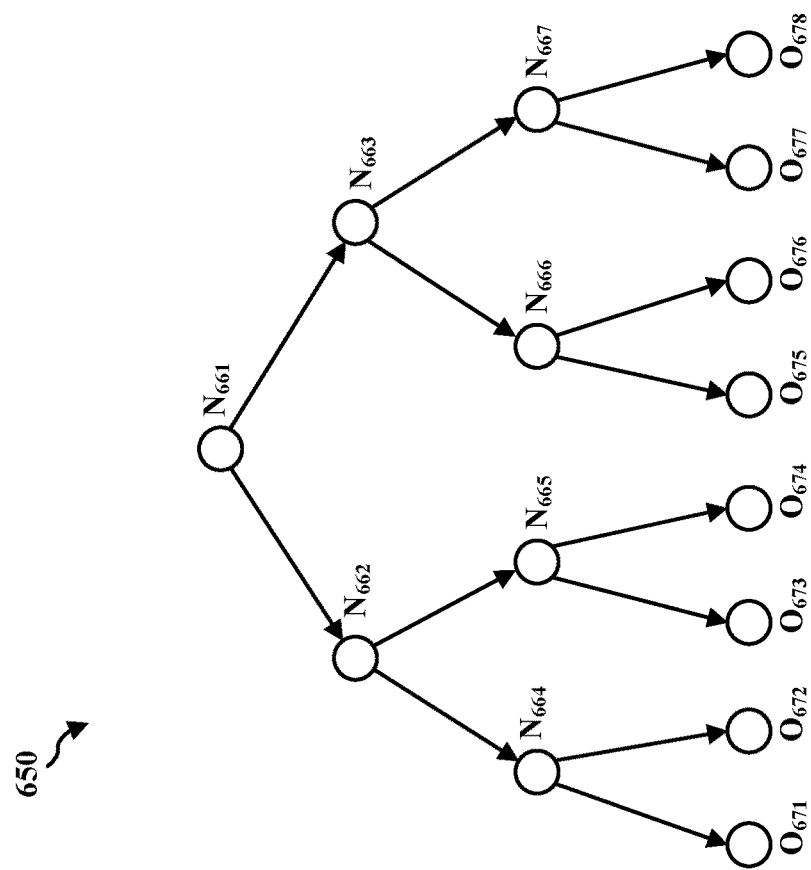
FIG. 6B is a diagram illustrating an example data structure in accordance with one or more techniques of this disclosure.
Figure 6A:
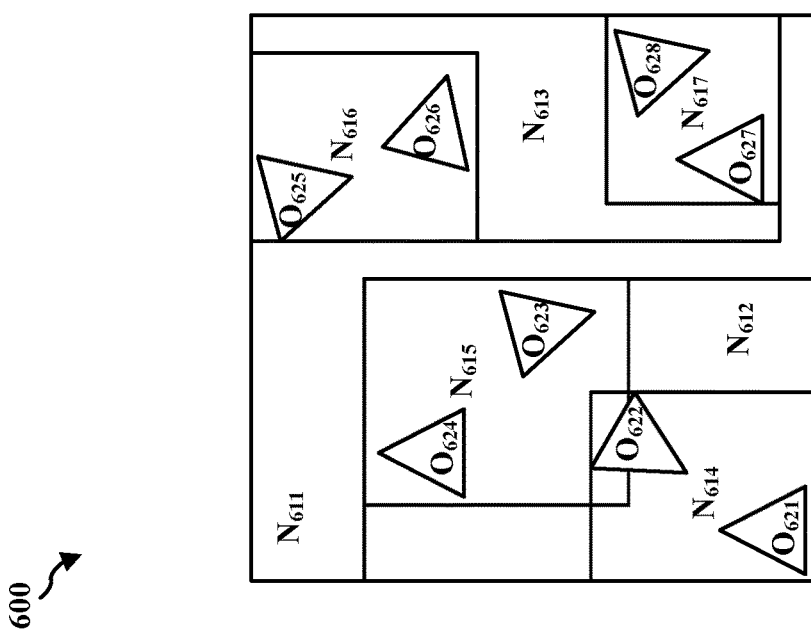
FIG. 6A is a diagram illustrating an example data structure in accordance with one or more techniques of this disclosure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ mg n solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

As indicated herein, some aspects of ray tracing may utilize bounding volume hierarchy compression. For instance, ray tracing techniques may compress wide nodes to fit a fixed size (e.g., 64 bytes). The BVH compression may compress all the contents of both inner nodes and leaf nodes to a certain amount (e.g., 64 bytes). In some instances, the BVH compression process may be a lossy compression (i.e., a method of data compression in which the size of the data is reduced by reducing or eliminating data) or a lossless compression (i.e., a method of data compression that allows the original data to be reconstructed from the compressed data). The BVH compression may also be aligned with a cacheline. Further, the BVH compression may store primitive/triangle data with the BVH, so that the data may not need to be separately fetched, e.g., fetched by a ray tracing unit (RTU). The BVH compression process may allow GPUs to improve bandwidth.

Figure 7A:
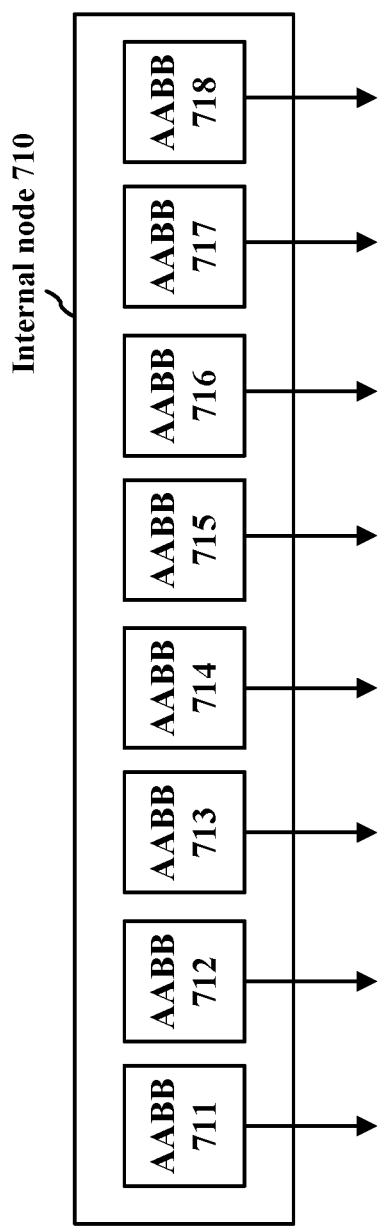
FIG. 7A is a diagram illustrating an example internal node structure in accordance with one or more techniques of this disclosure.
Figure 7B:
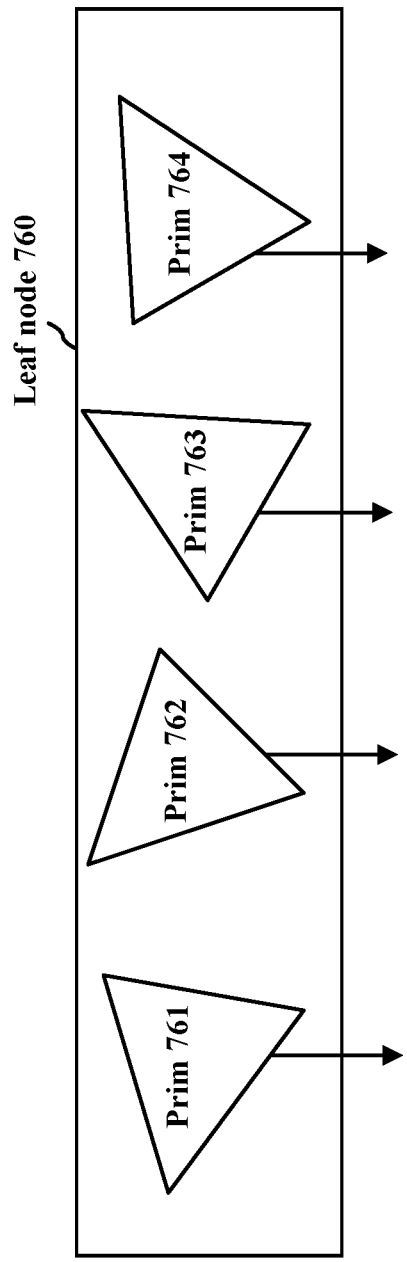
FIG. 7B is a diagram illustrating an example leaf node structure in accordance with one or more techniques of this disclosure.

FIGS. 7A and 7B illustrate diagram 700 and diagram 750, respectively, including an example internal node structure and an example leaf node structure utilized in ray tracing. As shown in FIG. 7A, diagram 700 includes internal node 710 including AABB 711, AABB 712, AABB 713, AABB 714, AABB 715, AABB 716, AABB 717, and AABB 718. FIG. 7A depicts that the BVH compression may include an internal node compression that compresses an amount of AABBs (e.g., eight AABBs) and/or an index of a first child node. As shown in FIG. 7B, diagram 750 includes leaf node 760 including primitive 761, primitive 762, primitive 763, and primitive 764. FIG. 7B depicts that the BVH compression may also include a leaf node compression that compresses a certain amount of primitives/triangles (e.g., up to four primitives/triangles) and the corresponding indices.

Some aspects of BVH compression may utilize wide BVH nodes, i.e., BVH nodes with more child nodes (e.g., 8 child nodes) compared to other BVH nodes. In some instances, each wide BVH nodes may be compressed and stored (e.g., stored in 64 bytes). These types of nodes may be stored/packed tightly with no empty space. The child nodes may be adjacent to one another, but may also be stored in any location. This type of BVH compression may allow for the random access of contiguous blocks. Also, each of the BVH compression steps may be performed on a GPU in compute mode.

Ray tracing techniques may also utilize bounding volume hierarchy (BVH) traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays. Additionally, there may be a number of different ray tracing stages utilized in hardware or software, e.g., GPU/CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

As mentioned herein, internal nodes of BVH structures may contain a certain amount of access aligned bounding boxes (AABBs) (e.g., up to 8 AABBs as shown in FIG. 7A). Each of the valid child AABBs may be stored/packed contiguously in the internal node (e.g., starting at index 0). Also, each of the child AABBs may be associated with a maximum AABB value and a minimum AABB value. In some instances, invalid child nodes may have a minimum AABB value that is greater than a maximum AABB value. The internal node may also include an integer node ID of the first child node (e.g., a 32-bit integer node). Further, each of the child nodes may be contiguous in the internal node. Also, the order of the child nodes may be used to express a traversal priority.

In some aspects, the process of BVH compression may include a number of different internal node compression algorithms. For example, an internal node compression algorithm may determine a minimum coordinate in each dimension. The internal node compression algorithm may also compute offsets from an anchor node. Also, the internal node compression algorithm may find and store an exponent of a largest offset per dimension. The internal node compression algorithm may also shift mantissas (i.e., the portion of a floating-point number that represents the significant digits of that number) of offsets in order to share exponent values. Moreover, the internal node compression algorithm may round mantissas to a number of bits (e.g., 8 bits). In some instances, the internal node compression algorithm may be a lossy compression, and it may be successful a large portion of the time. The BVH compression process may also be lossless compression. If the BVH compression fails, the internal node may be split into more leaf nodes. The leaf nodes may include a fairly uniform distribution of primitives per leaf node. Further, if the BVH compression fails, the weight of the non-compressing node may be increased and the node optimizer may select a different partitioning.

Additionally, the process of BVH compression may include internal node decompression algorithms. For example, an internal node decompression algorithm may recreate coordinate offsets, such as by the following steps: (1) shift a mantissa based on a leading '1' value; (2) bias a shared exponent based on a leading '1' value; and (3) pack/store the offsets into a floating-point coordinate (e.g., a 32-bit floating-point coordinate). The internal node decompression algorithm may also recreate an anchor node. Further, the internal node decompression algorithm may add an anchor node to a coordinate offset.

Figure 8A:
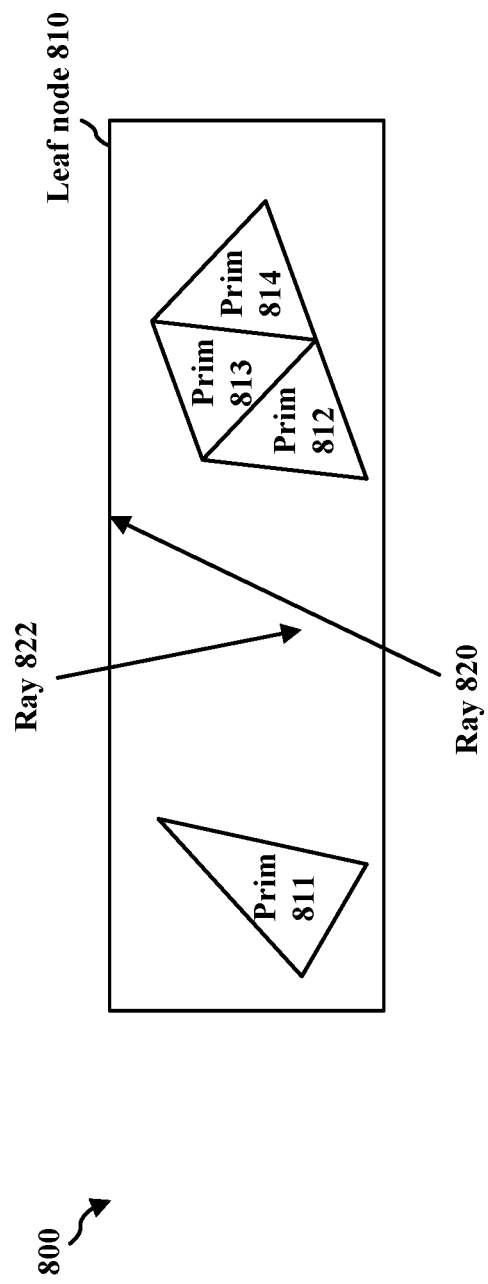
FIG. 8A is a diagram illustrating an example leaf node structure in accordance with one or more techniques of this disclosure.
Figure 8B:
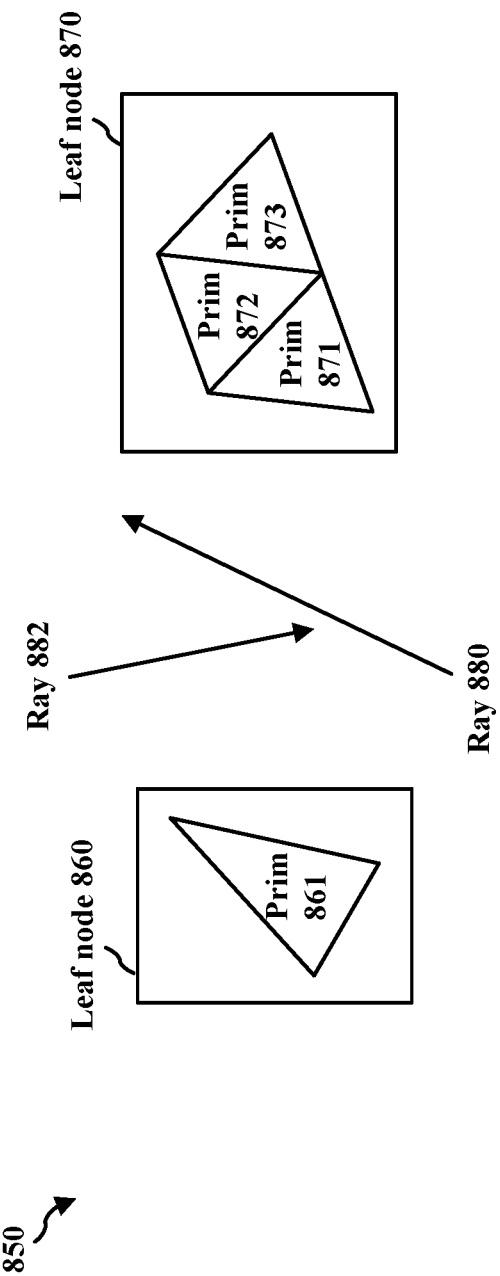
FIG. 8B is a diagram illustrating an example leaf node structure in accordance with one or more techniques of this disclosure.

FIGS. 8A and 8B illustrate diagram 800 and diagram 850, respectively, including example leaf nodes and corresponding primitives utilized in ray tracing. As shown in FIG. 8A, diagram 800 includes leaf node 810 including primitive 811, primitive 812, primitive 813, and primitive 814. Diagram 800 also depicts rays 820 and 822 that intersect the leaf node 810. As the rays 820 and 822 intersect the leaf node 810, they will be added to the traversal steps for the ray tracing process. As shown in FIG. 8B, diagram 850 includes leaf node 860 including primitive 861 and leaf node 870 including primitive 871, primitive 872, and primitive 873. Diagram 850 also depicts rays 880 and 882 do not intersect leaf node 860 or leaf node 870. As the rays 880 and 882 do not intersect leaf node 860 or leaf node 870, they will not be added to the traversal steps for the ray tracing process. As the two rays 880 and 882 do not hit either of the leaf nodes 860 and 870, the two traversal steps for these two rays do not need to be performed. Accordingly, as shown in FIGS. 8A and 8B, a smaller amount of primitives per leaf node may reduce the amount of traversal steps, which may in turn save bandwidth and/or increase processing speed. In contrast, if there are more primitives per leaf node (e.g., 4 primitives per node), it may be necessary to perform more traversal steps.

In some instances, there may be a number of unique floating-point coordinates for each of the primitives in a node. For example, there may be up to 36 unique floating-point coordinates in a node containing four primitives (i.e., 36 floating-point coordinates=3 vertices*3 coordinates*4 primitives per node). These nodes may contain a number of different primitives/triangles (e.g., 1, 2, 3, or 4 primitives/triangles). Additionally, these unique floating-point coordinates for each of the primitives in a node may have a certain amount of entropy. These unique floating-point coordinates may also be sorted to organize all of the coordinates. Further, in some instances, a difference between current floating-point coordinates and prior floating-point coordinates may be computed.

Ray tracing processes may utilize an acceleration data structure (AS). In some instances, without utilizing an AS, a ray in the ray tracing process may intersect every primitive in a scene. In contrast, with a suitable AS, the number of intersection operations may be reduced (e.g., reduced by up to log n). In one example, a scene with 1,000,000 triangles might take 20 intersection operations with a state-of-the-art AS. These types of data structures may be associated with the aforementioned BVH structures including AABBs. As indicated herein, a BVH is a binary tree whose root node contains the AABB including the scene geometry. Each primitive in this node may be assigned to either a left child node or a right child node. The child node may contain the AABBs including their assigned geometry, and this geometry may be likewise assigned to the left or right child nodes, recursively, until the leaf nodes contain a small number of primitives (e.g., 4 or fewer primitives). In some instances, to achieve memory bandwidth gains, each of the BVH nodes may be compressed into a certain number of bytes (e.g., 64 bytes) in order to take advantage of a cache line size.

In some aspects of ray tracing, leaf nodes may contain information concerning the actual primitives which make up the geometry of a scene. Leaf nodes may contain index and vertex buffers for each of these primitives. However, the leaf nodes may not contain the primitives themselves (i.e., per vertex primitive coordinates may not be stored in leaf nodes). For instance, storing a copy of the primitives in the leaf nodes may be an expensive proposition if there are different types of primitives allowed by an application program interface (API). In some instances, without compression, one primitive/triangle may fit in a leaf node. Indeed, without compression, four triangles stored in one leaf node may have to be stored as four individual leaf nodes, plus an additional internal node to connect them. Further, without leaf node compression, a ray tracing unit (RTU) may be faced with: a higher number of traversal loop iterations (i.e., hops) to trace a ray, higher memory bandwidth consumption to fetch a separate node for each triangle (plus more internal nodes), and higher power consumption to fetch and process additional nodes. In addition, the process of determining the number of primitives per leaf node may be a complex task. In some instances, these steps may include negative consequences, such as leaf node bloating (i.e., increasing of the size of leaf nodes), which is not optimal for leaf node compression. Based on the above, it may be beneficial to utilize an efficient leaf node compression algorithm to store a copy of primitives in leaf nodes. It may also be beneficial to efficiently determine the number of primitives per leaf node.

Aspects of the present disclosure may utilize an efficient leaf node compression algorithm to store a copy of primitives in leaf nodes. Aspects of the present disclosure may also efficiently determine the number of primitives per leaf node. For instance, aspects of the present disclosure may include a lossless compression mechanism to handle the compression of leaf nodes, where leaf nodes may store a copy of primitives (i.e., floating-point coordinates). Also, each of the leaf nodes may contain a number of primitives (e.g., 1, 2, 3, or 4 primitives). Aspects of the present disclosure may utilize a combination of arithmetic compression techniques, i.e., techniques that involve performing reversible math operations on the vertices of primitives and storing the result in a number of bits. This type of compression may compress up to a certain number of primitives/triangles (e.g., 3 or 4 primitives/triangles) into a certain number of bytes (e.g., 64 bytes).

In some instances, aspects presented herein may utilize a leaf node compression algorithm. For instance, aspects presented herein may include the ability to store triangle geometry within a BVH data structure. An application program interface (API) may specify that a copy of the geometry is produced, and aspects presented herein may compress this copy and store it in-line with internal nodes. Aspects presented herein may also support a number of types of primitives per API. For example, aspects presented herein may support triangles as primitives (e.g., triangles with 3 vertices, 3 dimensions, and 4 bytes). Aspects presented herein may also support procedural primitives including AABBs with minimum and maximum vertices. Also, aspects presented herein may support instances of bottom level acceleration structures (BLASs) including AABBs with minimum and maximum vertices. Moreover, aspects of the present disclosure may store AABBs similar to a primitive/triangle. For an example primitive including three vertices, vertex 0 may correspond to a minimum AABB value, vertex 1 may correspond to a maximum AABB value, and vertex 2 may correspond to a minimum AABB value (i.e., a value that may be removed after compression). Further, a primitive ID or instance ID (e.g., a 4-byte integer primitive ID or instance ID) for each primitive may be stored in a leaf node. Also, data structures may be utilized for interpreting certain compressed nodes (e.g., a 64-byte compressed node) for different numbers of primitives per leaf node.

Additionally, aspects presented herein may utilize a compression algorithm that compresses a primitive identifier (ID) and a geometry ID for each primitive. The primitive ID and geometry ID may be compressed into a number of bits (e.g., 32 bits). The compression algorithm may compress coordinates for each primitive (e.g., floating-point coordinates or floating point coordinates). These coordinates may be used as predictors of other coordinates (e.g., other floating-point coordinates). The compression algorithm may also compute a signed difference between coordinates (e.g., a signed difference between floating-point coordinates). To compute this signed difference, the compression algorithm may use monotonic integer values (i.e., monotonic bits) for the values of the floating-point coordinates. The compression algorithm may also store this signed difference instead of the original floating-point coordinate. Further, the compression algorithm may crop or modify the difference between coordinates to be less than a number of bits (e.g., less than 32 bits).

Figure 9:
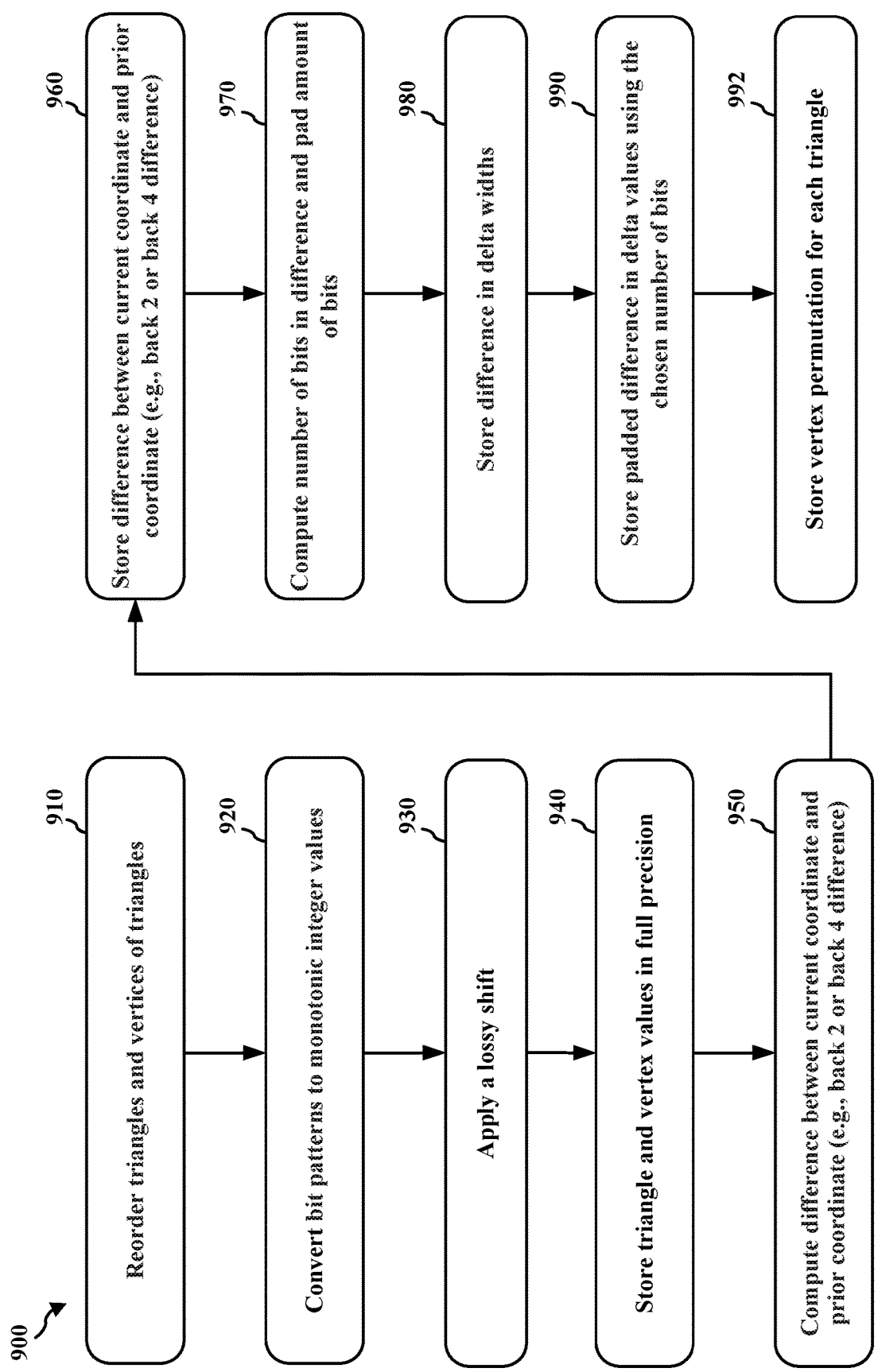
FIG. 9 is a diagram illustrating an example compression algorithm call flow in accordance with one or more techniques of this disclosure.

FIG. 9 illustrates diagram 900 including one example of a call flow for a compression algorithm. As shown in FIG. 9, diagram 900 includes a number of steps (e.g., steps 910, 920, 930, 940, 950, 960, 970, 980, 990, and 992) for a compression algorithm according to aspects of the present disclosure. At step 910, the compression algorithm may reorder triangles/primitives and vertices of triangles/primitives. For instance, the compression algorithm may reorder triangles and vertices of triangles to determine an order with an ideal predicting ability. For example, the compression algorithm may reorder triangles and vertices of triangles in a winding-preserving manner (i.e., preserve the order in which the vertices are rotated around the center of the triangle). Each triangle may have a clockwise winding or a counter-clockwise winding. In some instances, the winding order may be determined when a user issues a draw command and the vertices are processed by the rendering pipeline in an order provided by a vertex specification. At step 920, the compression algorithm may convert bit patterns to monotonic integer values. For instance, the compression algorithm may convert bit patterns to be monotonic in a real-number value by converting to a monotonic format (e.g., a monotonic bit format). At step 930, the compression algorithm may apply a lossy shift (i.e., rounding off the floating point number to discard the least significant bits). At step 940, the compression algorithm may store primitive/triangle and vertex values in full precision. For instance, the compression algorithm may store triangle and vertex values (e.g., triangle 0, vertex 0) in full precision as an anchor value for the algorithm. At step 950 in FIG. 9, for each coordinate, the compression algorithm may compute a difference between the current coordinate and a prior coordinate. For instance, the difference may be between a prior coordinate of the same dimension, as either a back 2 difference (BACK_2) (i.e., the coordinate value is adjusted back by 2 coordinate values) or a back 4 difference (BACK_4) (i.e., the coordinate value is adjusted back by 4 coordinate values) from the current coordinate. At step 960, the compression algorithm may store the difference between the current coordinate and the prior coordinate. For instance, the BACK_2 value or BACK_4 value may be stored as enum (e.g., this may be implicit for coordinates '0' or '1'). At step 970, the compression algorithm may compute a number of bits in the difference value and pad an amount of bits (e.g., pad up to 0, 16, 20, or 24 bits). At step 980, the compression algorithm may store a difference in a delta width value of the coordinates. For instance, the difference width enum may be stored in a deltaWidths array. At step 990, the compression algorithm may store a padded difference in delta values using a selected number of bits. At step 992, the compression algorithm may store a vertex permutation for each primitive/triangle (e.g., store the vertex permutation in a 'vertPerms' field so the value may be reversed later).

In some instances, each of the compressed leaf nodes may be stored to a certain location, and the location may be in turn compressed. For instance, as an indicator of the remaining entropy after compression, all compressed leaf nodes may be stored to a file and compressed using file compressors. These file compressors may be able to compress the file by an additional amount (e.g., a compression of 21%), which may indicate a suitable level of compression performance of the compression algorithm. The compression algorithm may also be utilized with block-based compression that may not utilize redundancy across nodes.

Aspects of the present disclosure may compress primitive IDs and geometry IDs for certain primitives. For instance, the primitive ID and geometry ID for each of the primitives may be packed/compressed into multiple bits of integers (e.g., 32-bit integers). The primitive IDs may then be stored in a number of bytes (e.g., 4 bytes). The remaining primitive IDs may be stored as differences near the front of a delta array. Also, the differences may be rounded up to the nearest byte. For example, if the difference between primitive IDs is +1, this value may be stored in 0 bytes. Also, an enum may be used to indicate the type of packing, where the enums are stored at the front of a delta widths array. An enum may be a bit field where the bit encodings represent symbolic values. For example, a two-bit enum may have the values 00, 01, 10, and 11. These values may be used to represent different modes or states. For example, the CrdWidth enum may correspond to 0, 16, 20, and 24 bits.

In some instances, aspects presented herein may use coordinates (e.g., floating-point coordinates) as a manner in which to predict other coordinates. Aspects presented herein may also compute a signed difference from one coordinate to another coordinate. For example, monotonic bit coordinates may be use as integer values (e.g., monotonic integer values). The difference between coordinates may then be stored instead of the original coordinate value. Further the differences between coordinates may be cropped or modified to a certain number of bits (e.g., less than 32 bits).

Figures 10A, 10B:
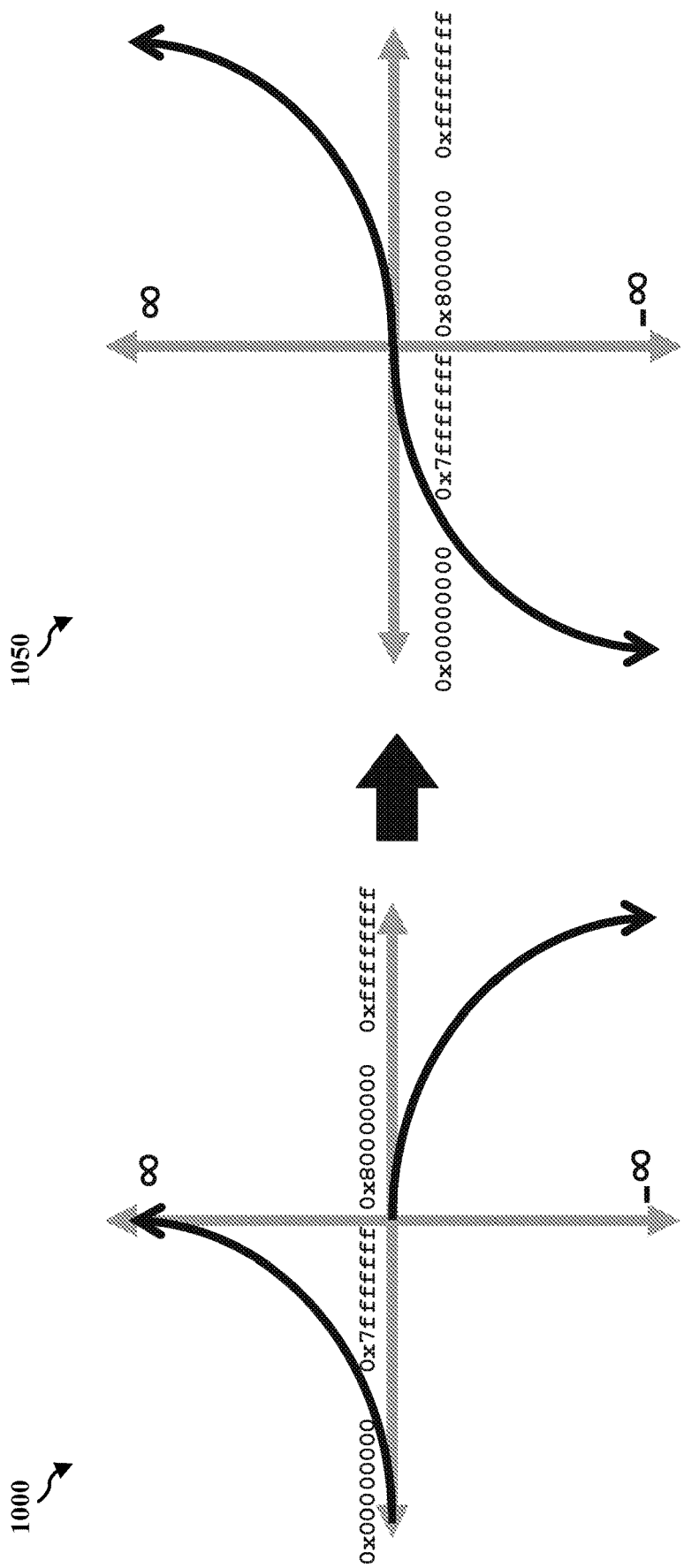
FIG. 10A is a diagram illustrating an example graph of floating-point coordinates in accordance with one or more techniques of this disclosure.
FIG. 10B is a diagram illustrating an example graph of floating-point coordinates in accordance with one or more techniques of this disclosure.

As indicated herein, floating-point coordinates may not produce values that are sufficiently monotonic to produce suitable results for compression. As such, the binary representation of the floating-point coordinates may be converted to a monotonic integer value. FIGS. 10A and 10B illustrate graphs 1000 and 1050, respectively, including examples of a binary representation of floating-point coordinates and a monotonic integer value of the floating-point coordinates. As shown in FIG. 10A, graph 1000 includes x-axis values of [0x0000000] to [0xffffffff] and y-axis values of [−∞] to [∞]. Graph 1000 charts the binary representation of floating-point coordinates from [0x0000000] to [0x7fffffff] and [0x8000000] to [0xffffffff] (i.e., these values represent bit encodings of all possible 32-bit numbers). These 32-bit encodings may be used to represent a floating-point number. For instance, if a 32-bit number is interpreted as an integer, then integer math may be performed on the 32-bit number. Similar to graph 1000, graph 1050 also includes x-axis values of [0x0000000] to [0xffffffff] and y-axis values of [−∞] to [∞]. Graph 1050 also charts the binary representation of floating-point coordinates from [0x0000000] to [0x7fffffff] and [0x8000000] to [0xffffffff]. However, as shown in FIG. 10B, the floating-point coordinates in FIG. 10A are converted to monotonic integer values in FIG. 10B. More specifically, in FIG. 10B, the floating-point coordinates in FIG. 10A are converted to a bit vector that is monotonic in the floating-point value. As depicted in FIG. 10B, the bit patterns of floating-point coordinates are monotonic, except for a discontinuity at sign.

Additionally, aspects presented herein may compress or pack floating-point coordinates. For instance, aspects presented herein may sort coordinates for use predicting other coordinates including bits to index these coordinates. In some instances, the order of triangles in a node may be unconstrained, and the order of vertices in the triangle may be unconstrained, but the winding order may be preserved. Also, aspects of the present disclosure may permute triangles for an optimized prediction without needing to store the pattern enum. In some instances, when the speed of compression is at issue, a compressor may use heuristics to select a permutation of triangles, rather than attempting every possible permutation.

Aspects of the present disclosure may also utilize offsets for coordinate prediction. For instance, each coordinate may be predicted by a coordinate back 2 algorithm or a coordinate back 4 algorithm. As described in step 950 in FIG. 9, for each coordinate, the compression algorithm may compute a difference between the current coordinate and a prior coordinate. For instance, the difference may be between a prior coordinate of the same dimension, as either a back 2 difference (BACK_2) (i.e., adjust the coordinate value back by 2 coordinate values) from the current coordinate or a back 4 difference (BACK_4) (i.e., adjust the coordinate value back by 4 coordinate values) from the current coordinate.

Figure 11:
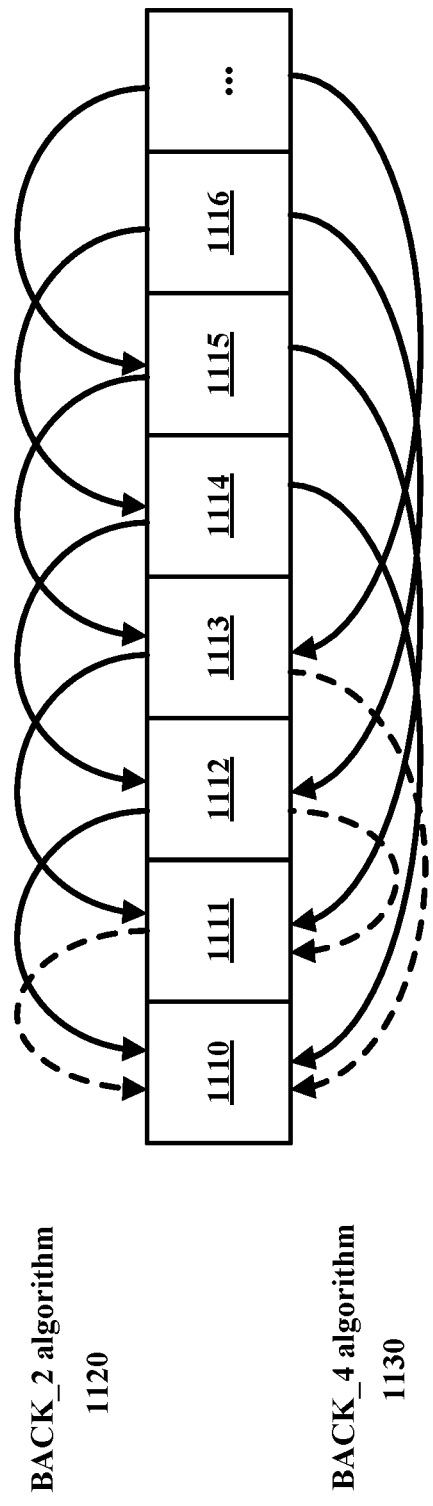
FIG. 11 is a diagram illustrating an example compression algorithm structure in accordance with one or more techniques of this disclosure.

FIG. 11 illustrates diagram 1100 including one example of a compression algorithm, e.g., a BACK_2 algorithm and a BACK_4 algorithm. As shown in FIG. 11, diagram 1100 includes coordinate value 1110, coordinate value 1111, coordinate value 1112, coordinate value 1113, coordinate value 1114, coordinate value 1115, and coordinate value 1116 (e.g., floating-point coordinate values), BACK_2 algorithm 1120, and BACK_4 algorithm 1130. As depicted in FIG. 11, BACK_2 algorithm 1120 adjusts the coordinate values back by two coordinate values. For example, under BACK_2 algorithm 1120, coordinate value 1116 will be adjusted to coordinate value 1114. As further depicted in FIG. 11, BACK_4 algorithm 1130 adjusts the coordinate values back by four coordinate values. For example, under BACK_4 algorithm 1130, coordinate value 1116 will be coordinate value 1112. There are a few special cases for BACK_2 algorithm 1120 and BACK_4 algorithm 1130. For instance, the first coordinate value (e.g., coordinate value 1110) may have no predicted value, as it is the anchor coordinate. Also, the enums for the first two coordinates (e.g., coordinate values 1110 and 1111) may not be stored. In BACK_4 algorithm 1130, coordinate value 1112 corresponds to coordinate value 1111, and coordinate value 1113 corresponds to coordinate value 1110. Also, coordinate value 1111 may be implicitly predicted by coordinate value 1110.

Aspects of the present disclosure may also include a lossy shift component to the algorithm. For instance, the lossy shift may shift right by N least significant bits (LSBs) to improve compression success. This lossy shift may be acceptable for instance and procedural (AABB) primitives. Also, the lossy shift may allow instance nodes to fit metadata values associated with each AABB (e.g., an instance mask (InstanceMask) and instance flags (InstanceFlags)) for each primitive. The lossy shift may also be performed on triangles, but it is lossy, so it may not be best to utilize on all triangles. Further, the lossy shift may decompress with a left shift of N bits. The purpose of the lossy shift may be to store AABB primitives in a reduced amount of space, so that space is available to be used for metadata. The lossy shift may apply to all coordinates of the leaf node, including those with 1 primitive per leaf and anchor nodes. Also, N bits may be stored in a two-bit lossy shift flag of leaf nodes, e.g., LOSSY_SHIFT_0=0, LOSSY_SHIFT_4=1, LOSSY_SHIFT_8=2, and LOSSY_SHIFT_16=3. During decompression, the lossy shift may be applied before a monotonic bit-to-floating-point coordinate conversion (i.e., a monoBitsToFloat conversion). After the lossy shift, a certain number of LSBs (e.g., N LSBs) may be equal to 0. The lossy shift may be primarily utilized with AABB coordinates, which may conservatively tolerate precision loss (as with inner node AABBs). However, the lossy shift may also be used with leaf nodes containing triangles, which may introduce a simple lossy compression. In some instances of compression, an improved compression may be more important than an improved precision. When the lossy shift is applied to triangle coordinates it may be important for the same shift to be applied to all coordinates in a BLAS. This may ensure that shared coordinates, such as coordinates in triangle strips, will continue to have precisely the same value and no small gaps will be introduced between them, which may break the water tightness in nodes.

In some instances, each of the BVH nodes may be compressed to a certain number of bytes (e.g., 64 bytes). For example, nodes may be stored/packed into 64-byte aligned memory accessible to a GPU. In general, these nodes may be in a system memory, but it is also possible for entire BVH structures to be stored in the graphics memory (GMEM) for increased performance. In general, the higher a node is in the BVH structure, the more often it may be accessed, so storing nodes in the GMEM may allow for increased performance.

For internal nodes, the compression algorithm may determine the minimum coordinate in each dimension (i.e., an anchor coordinate) and store the coordinate as a floating-point coordinate. The compression algorithm may then compute the offset from the anchor coordinate (e.g., if the floating-point coordinate greater than or equal to 0). This may allow the compression to identify the exponent of the largest offset per dimension. The compression algorithm may then align mantissas to share exponents, and round the mantissas to a certain amount of bits (e.g., 8 bits). Further, the compression algorithm may round minima downward and round maxima upward. This compression algorithm may yield the following properties: the compression succeeds a high amount of time, the compression is lossy but conservative, and for 8-bit offset mantissas the algorithm may expect a certain amount of node over-processing (e.g., 4% node over-processing).

Compression algorithms herein may also utilize metadata. For instance, each primitive may have a 32-bit integer mix of a primitive index and a geometry index. Masking these indices together may be a part of a binary BVH build. The primitive IDs may not be contiguous and may be stored explicitly, and they may be compressed using a similar scheme to coordinate data. The anchor may be stored explicitly in a primitive ID (e.g., primitive ID 0). Subsequent indices may be stored as deltas from the immediate prior index. The deltas may be stored in the deltas array and the widths may be stored as two-bit enums (e.g., primitive ID enum) in the delta widths array. Instance primitives may have additional metadata that is stored in the coordinate positions of a primitive vertex (e.g., vertex 2).

Additionally, the compression algorithms may utilize primitive and vertex permutation. The application program interface (API) may place no constraints on the order of primitives in a BVH leaf node. Thus, the compression algorithm may attempt multiple orderings until one is found with deltas small enough to fit in a deltas field. Likewise, triangle vertices may be reordered to reduce the size of the deltas. But in this case, the API may place two constraints on the ordering: (1) the device API may query the UV coordinates of a hit (relative to two edges of a triangle in API order), and (2) the device API may query whether the triangle is front-facing or back-facing, which depends on the vertex ordering. Because vertex permutation is advantageous to compression, but the API places these constraints, the vertex permutation may be stored in the compressed file so that it may be reversed upon decompression. Also, a two-bit enum per triangle may be utilized during the compress process.

Aspects of the present disclosure may include a number of benefits or advantages. For instance, aspects presented herein may utilize an efficient leaf node compression algorithm to store a copy of the primitives in the leaf nodes. Aspects of the present disclosure may also efficiently determine the number of primitives per leaf node. Aspects of the present disclosure may also utilize a lossless compression with a lossy variant that increases the rate of success for the compression. For example, by discarding a certain amount of the floating-point coordinates during the compression, the compression success rate may be increased. Aspects presented herein may write all successfully compressed leaf nodes to a disk. Aspects presented herein may then compress this file with a high rate of success. By compressing with a high rate of success, aspects presented herein may improve ray tracing performance, as well as optimize memory bandwidth.

Figure 12:
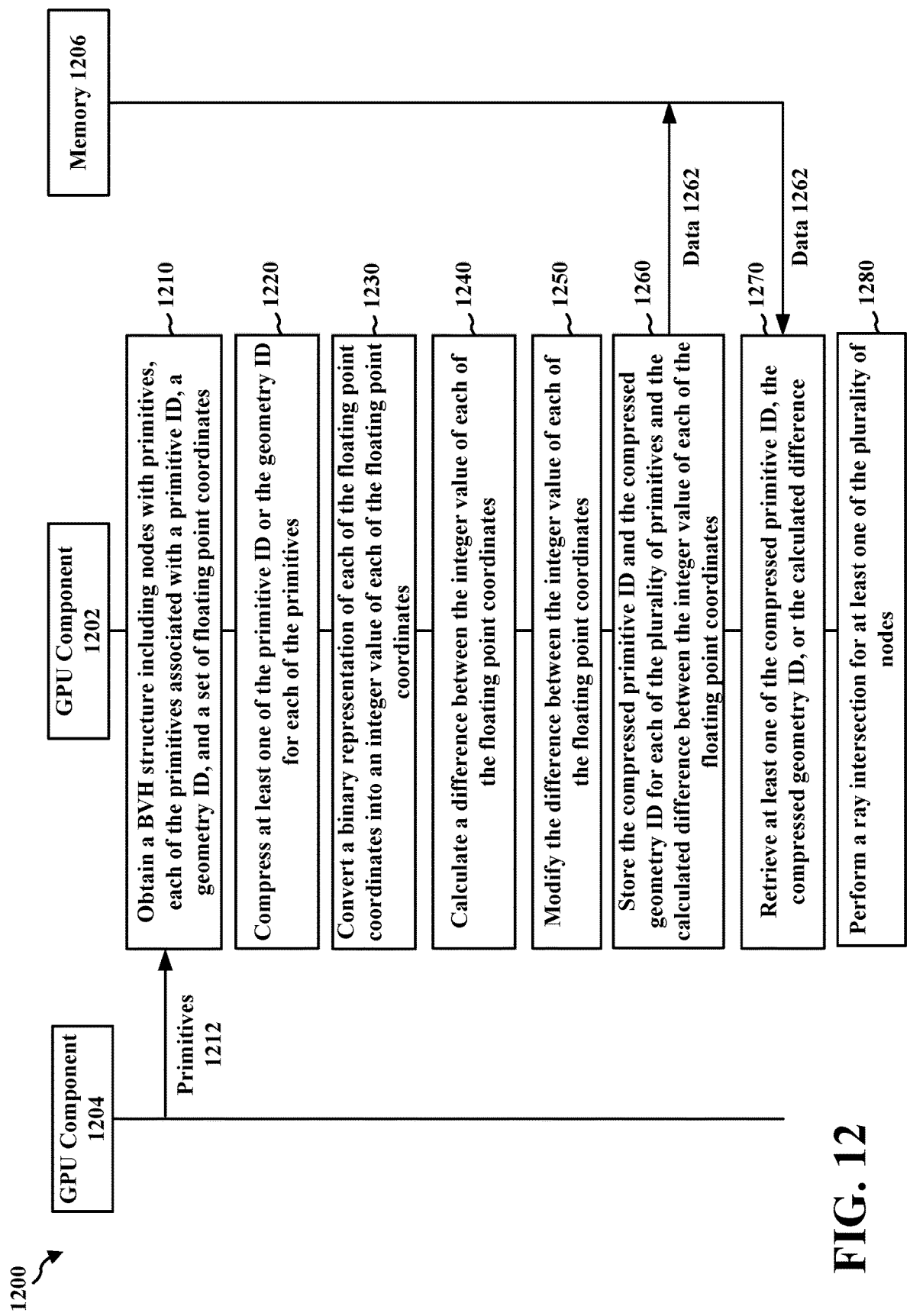
FIG. 12 is a communication flow diagram illustrating example communications between GPU components in accordance with one or more techniques of this disclosure.

FIG. 12 is a communication flow diagram 1200 of graphics processing in accordance with one or more techniques of this disclosure. As shown in FIG. 12, diagram 1200 includes example communications between components of a GPU (or other graphics processor), such as GPU component 1202, GPU component 1204, and memory 1206 (e.g., GMEM or system memory), in accordance with one or more techniques of this disclosure.

At 1210, GPU component 1202 may obtain a bounding volume hierarchy (BVH) structure including a plurality of nodes, the BVH structure being associated with geometry data for a plurality of primitives in a scene (e.g., primitives 1212), each of the plurality of nodes including one or more primitives of the plurality of primitives, and each of the plurality of primitives being associated with at least one of a primitive identifier (ID), a geometry ID, or a set of floating-point coordinates. The primitives in the scene (e.g., primitives 1212) may be received from another component or another portion of the GPU (e.g., GPU component 1204). Each of the set of floating-point coordinates for each of the plurality of primitives may be associated with an axis aligned bounding box (AABB). Also, each of the set of floating-point coordinates may correspond to a minimum AABB value or a maximum AABB value. Each of the set of floating-point coordinates for each of the plurality of primitives may be associated with a predicted offset for each of the set of floating-point coordinates. For example, to obtain a predicted offset, a compression algorithm may compute an offset from an anchor coordinate or node. This predicted offset may be the difference between the current coordinate and a prior coordinate of a same dimension, for example, a back 2 difference from the current coordinate (i.e., adjust the coordinate value back by 2 coordinate values) or a back 4 difference from the current coordinate (i.e., adjust the coordinate value back by 4 coordinate values).

In some aspects, the BVH structure may include a plurality of levels, and each level of the plurality of levels may include at least one node of the plurality of nodes. The plurality of nodes may include a plurality of internal nodes and a plurality of leaf nodes, and the plurality of internal nodes may be associated with a plurality of bounding boxes for the plurality of primitives, and the plurality of leaf nodes may be associated with the geometry data for the plurality of primitives. Also, the BVH structure may be a data structure associated with a ray tracing process for the plurality of primitives in the scene, and the ray tracing process may include a plurality of rays associated with the geometry data for the plurality of primitives. The one or more primitives included in each of the plurality of nodes may include: one primitive, two primitives, three primitives, or four primitives.

At 1220, GPU component 1202 may compress at least one of the primitive ID or the geometry ID for each of the plurality of primitives. At least one of the primitive ID or the geometry ID for each of the plurality of primitives may be compressed into a plurality of bits (e.g., 32 bits).

At 1230, GPU component 1202 may convert a binary representation of each of the set of floating-point coordinates for each of the plurality of primitives into an integer value of each of the set of floating-point coordinates for each of the plurality of primitives. The integer value of each of the set of floating-point coordinates for each of the plurality of primitives may be a monotonic integer value.

At 1240, GPU component 1202 may calculate a difference between the integer value of each of the set of floating-point coordinates for each of the plurality of primitives. The calculated difference between the integer value of each of the set of floating-point coordinates may be a signed integer difference. In some aspects, at least one of the converted binary representation of each of the set of floating-point coordinates or the calculated difference between the integer value of each of the set of floating-point coordinates may be associated with a compression algorithm. For example, at least one of the converted binary representation of each of the set of floating-point coordinates or the calculated difference between the integer value of each of the set of floating-point coordinates may be an input into the compression algorithm or an output from the compression algorithm. The compression algorithm may adjust an order of the plurality of primitives or may adjust one or more vertices of each of the plurality of primitives. The compression algorithm may also select a number of permutations for the adjusted order of primitives or vertices, e.g., a first permutation of the adjusted order of the plurality of primitives or a second permutation of the adjusted one or more vertices of each of the plurality of primitives. The compression algorithm may also store a vertex permutation for each primitive/triangle. Further, the compression algorithm may be associated with a lossy shift of each of the plurality of nodes or each of the plurality of primitives.

At 1250, GPU component 1202 may modify the difference between the integer value of each of the set of floating-point coordinates for each of the plurality of primitives. At least one of the primitive ID or the geometry ID for each of the plurality of primitives may be compressed into 32 bits, and the difference between the integer value of each of the set of floating-point coordinates may be modified to be less than 32 bits.

At 1260, GPU component 1202 may store at least one of the compressed primitive ID or the compressed geometry ID for each of the plurality of primitives and the calculated difference between the integer value of each of the set of floating-point coordinates (e.g., data 1262). For example, data 1262 may be stored in memory 1206. At least one of the compressed primitive ID or the compressed geometry ID for each of the plurality of primitives and the calculated difference between the integer value of each of the set of floating-point coordinates may be stored in a graphics memory (GMEM) or a system memory (e.g., memory 1206).

At 1270, GPU component 1202 may retrieve at least one of the compressed primitive ID, the compressed geometry ID, or the calculated difference (e.g., data 1262) after storing at least one of the compressed primitive ID, the compressed geometry ID, or the calculated difference. For example, data 1262 may be retrieved from memory 1206.

At 1280, GPU component 1202 may perform a ray intersection for at least one of the plurality of nodes after retrieving at least one of the compressed primitive ID, the compressed geometry ID, or the calculated difference. For example, the ray intersection for at least one of the plurality of nodes may be a ray triangle intersection for a plurality of internal nodes of the plurality of nodes and/or a ray box intersection for a plurality of leaf nodes of the plurality of nodes.

Figure 13:
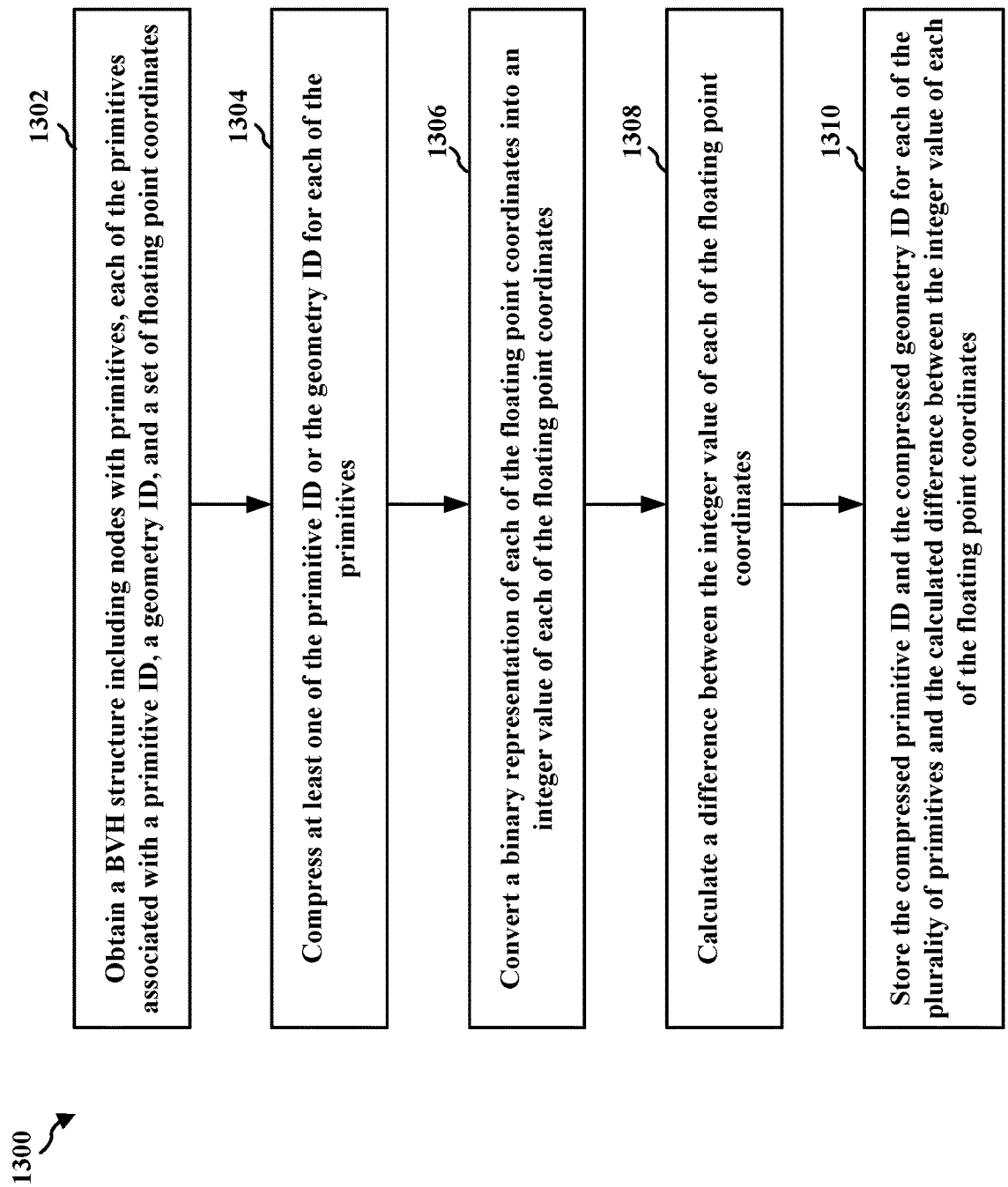
FIG. 13 is a flowchart of an example method of graphics processing in accordance with one or more techniques of this disclosure.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1302, the GPU may obtain a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with at least one of a primitive identifier (ID), a geometry ID, or a set of floating-point coordinates, as described in connection with the examples in FIGS. 1-12. For example, as described in 1210 of FIG. 12, GPU component 1202 may configure a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with a primitive identifier (ID), a geometry ID, and a set of floating-point coordinates. Further, step 1302 may be performed by processing unit 120 in FIG. 1. The primitives in the scene may be received from another component or another portion of the GPU. Each of the set of floating-point coordinates for each of the plurality of primitives may be associated with an axis aligned bounding box (AABB). Also, each of the set of floating-point coordinates may correspond to a minimum AABB value or a maximum AABB value. Each of the set of floating-point coordinates for each of the plurality of primitives may be associated with a predicted offset for each of the set of floating-point coordinates.

In some aspects, the BVH structure may include a plurality of levels, and each level of the plurality of levels may include at least one node of the plurality of nodes. The plurality of nodes may include a plurality of internal nodes and a plurality of leaf nodes, and the plurality of internal nodes may be associated with a plurality of bounding boxes for the plurality of primitives, and the plurality of leaf nodes may be associated with the geometry data for the plurality of primitives. Also, the BVH structure may be a data structure associated with a ray tracing process for the plurality of primitives in the scene, and the ray tracing process may include a plurality of rays associated with the geometry data for the plurality of primitives. The one or more primitives included in each of the plurality of nodes may include, for example: one primitive, two primitives, three primitives, or four primitives.

At 1304, the GPU may compress at least one of the primitive ID or the geometry ID for each of the plurality of primitives, as described in connection with the examples in FIGS. 1-12. For example, as described in 1220 of FIG. 12, GPU component 1202 may compress at least one of the primitive ID or the geometry ID for each of the plurality of primitives. Further, step 1304 may be performed by processing unit 120 in FIG. 1. At least one of the primitive ID or the geometry ID for each of the plurality of primitives may be compressed into a plurality of bits (e.g., 32 bits).

At 1306, the GPU may convert a binary representation of each of the set of floating-point coordinates for each of the plurality of primitives into an integer value of each of the set of floating-point coordinates for each of the plurality of primitives, as described in connection with the examples in FIGS. 1-12. For example, as described in 1230 of FIG. 12, GPU component 1202 may convert a binary representation of each of the set of floating-point coordinates for each of the plurality of primitives into an integer value of each of the set of floating-point coordinates for each of the plurality of primitives. Further, step 1306 may be performed by processing unit 120 in FIG. 1. The integer value of each of the set of floating-point coordinates for each of the plurality of primitives may be a monotonic integer value.

At 1308, the GPU may calculate a difference between the integer value of each of the set of floating-point coordinates for each of the plurality of primitives, as described in connection with the examples in FIGS. 1-12. For example, as described in 1240 of FIG. 12, GPU component 1202 may calculate a difference between the integer value of each of the set of floating-point coordinates for each of the plurality of primitives. Further, step 1308 may be performed by processing unit 120 in FIG. 1. The calculated difference between the integer value of each of the set of floating-point coordinates may be a signed integer difference. In some aspects, at least one of the converted binary representation of each of the set of floating-point coordinates or the calculated difference between the integer value of each of the set of floating-point coordinates may be associated with a compression algorithm. The GPU, using the compression algorithm, may adjust an order of the plurality of primitives or may adjust one or more vertices of each of the plurality of primitives. The GPU, using the compression algorithm, may also select a first permutation of the adjusted order of the plurality of primitives or a second permutation of the adjusted one or more vertices of each of the plurality of primitives. Further, the compression algorithm may be associated with a lossy shift of each of the plurality of nodes or each of the plurality of primitives.

At 1310, the GPU may modify the difference between the integer value of each of the set of floating-point coordinates for each of the plurality of primitives, as described in connection with the examples in FIGS. 1-12. For example, as described in 1250 of FIG. 12, GPU component 1202 may modify the difference between the integer value of each of the set of floating-point coordinates for each of the plurality of primitives. Further, step 1310 may be performed by processing unit 120 in FIG. 1. At least one of the primitive ID or the geometry ID for each of the plurality of primitives may be compressed into 32 bits, and the difference between the integer value of each of the set of floating-point coordinates may be modified to be less than 32 bits.

Figure 14:
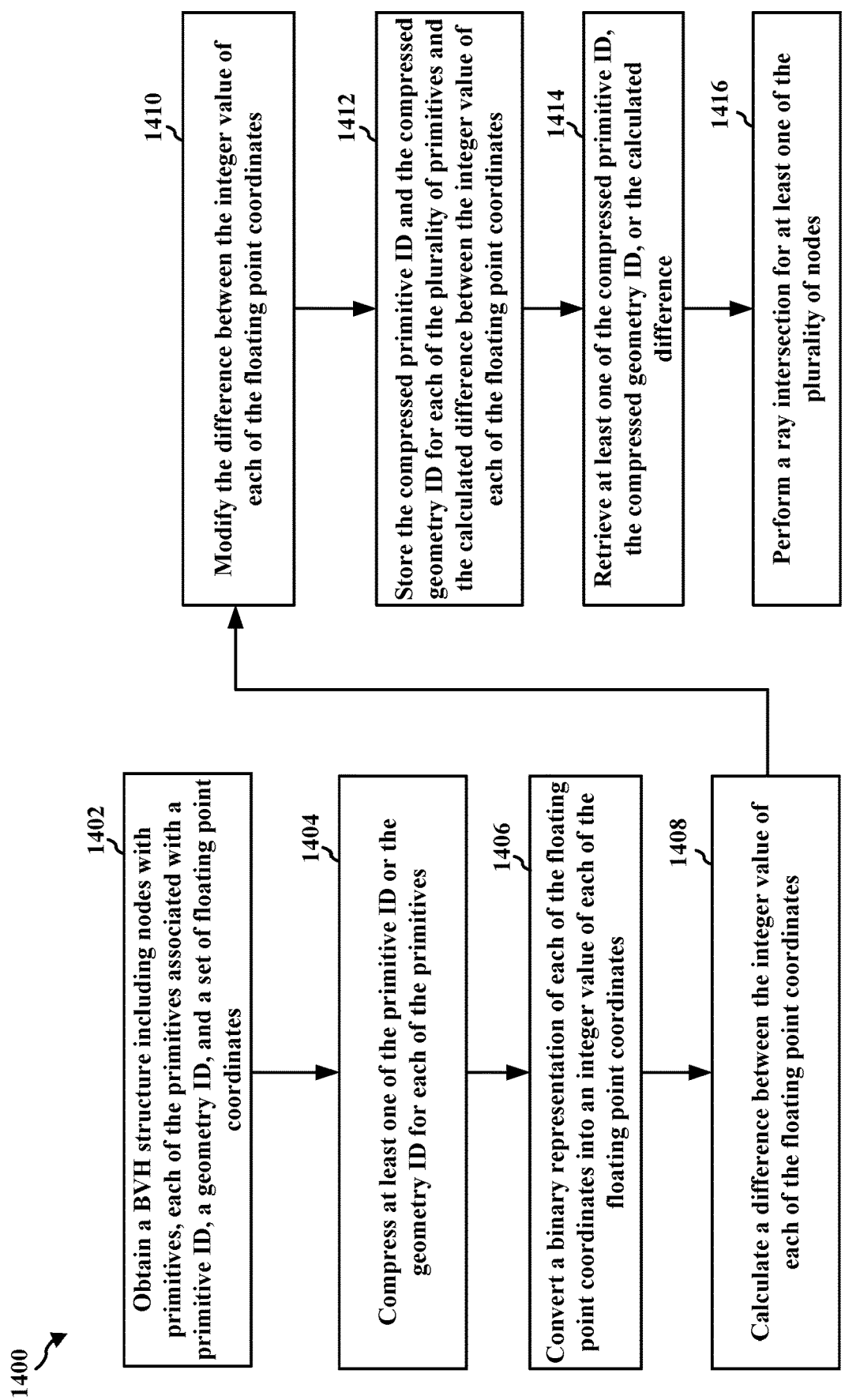
FIG. 14 is a flowchart of an example method of graphics processing in accordance with one or more techniques of this disclosure.

FIG. 14 is a flowchart 1400 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1402, the GPU may obtain a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with at least one of a primitive identifier (ID), a geometry ID, or a set of floating-point coordinates, as described in connection with the examples in FIGS. 1-12. For example, as described in 1210 of FIG. 12, GPU component 1202 may configure a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with a primitive identifier (ID), a geometry ID, and a set of floating-point coordinates. Further, step 1402 may be performed by processing unit 120 in FIG. 1. The primitives in the scene may be received from another component or another portion of the GPU. Each of the set of floating-point coordinates for each of the plurality of primitives may be associated with an axis aligned bounding box (AABB). Also, each of the set of floating-point coordinates may correspond to a minimum AABB value or a maximum AABB value. Each of the set of floating-point coordinates for each of the plurality of primitives may be associated with a predicted offset for each of the set of floating-point coordinates.

In some aspects, the BVH structure may include a plurality of levels, and each level of the plurality of levels may include at least one node of the plurality of nodes. The plurality of nodes may include a plurality of internal nodes and a plurality of leaf nodes, and the plurality of internal nodes may be associated with a plurality of bounding boxes for the plurality of primitives, and the plurality of leaf nodes may be associated with the geometry data for the plurality of primitives. Also, the BVH structure may be a data structure associated with a ray tracing process for the plurality of primitives in the scene, and the ray tracing process may include a plurality of rays associated with the geometry data for the plurality of primitives. The one or more primitives included in each of the plurality of nodes may include: one primitive, two primitives, three primitives, or four primitives.

At 1404, the GPU may compress at least one of the primitive ID or the geometry ID for each of the plurality of primitives, as described in connection with the examples in FIGS. 1-12. For example, as described in 1220 of FIG. 12, GPU component 1202 may compress at least one of the primitive ID or the geometry ID for each of the plurality of primitives. Further, step 1404 may be performed by processing unit 120 in FIG. 1. At least one of the primitive ID or the geometry ID for each of the plurality of primitives may be compressed into a plurality of bits (e.g., 32 bits).

At 1406, the GPU may convert a binary representation of each of the set of floating-point coordinates for each of the plurality of primitives into an integer value of each of the set of floating-point coordinates for each of the plurality of primitives, as described in connection with the examples in FIGS. 1-12. For example, as described in 1230 of FIG. 12, GPU component 1202 may convert a binary representation of each of the set of floating-point coordinates for each of the plurality of primitives into an integer value of each of the set of floating-point coordinates for each of the plurality of primitives. Further, step 1406 may be performed by processing unit 120 in FIG. 1. The integer value of each of the set of floating-point coordinates for each of the plurality of primitives may be a monotonic integer value.

At 1408, the GPU may calculate a difference between the integer value of each of the set of floating-point coordinates for each of the plurality of primitives, as described in connection with the examples in FIGS. 1-12. For example, as described in 1240 of FIG. 12, GPU component 1202 may calculate a difference between the integer value of each of the set of floating-point coordinates for each of the plurality of primitives. Further, step 1408 may be performed by processing unit 120 in FIG. 1. The calculated difference between the integer value of each of the set of floating-point coordinates may be a signed integer difference. In some aspects, at least one of the converted binary representation of each of the set of floating-point coordinates or the calculated difference between the integer value of each of the set of floating-point coordinates may be associated with a compression algorithm. The compression algorithm may adjust an order of the plurality of primitives or may adjust one or more vertices of each of the plurality of primitives. The compression algorithm may also select a first permutation of the adjusted order of the plurality of primitives or a second permutation of the adjusted one or more vertices of each of the plurality of primitives. Further, the compression algorithm may be associated with a lossy shift of each of the plurality of nodes or each of the plurality of primitives.

At 1410, the GPU may modify the difference between the integer value of each of the set of floating-point coordinates for each of the plurality of primitives, as described in connection with the examples in FIGS. 1-12. For example, as described in 1250 of FIG. 12, GPU component 1202 may modify the difference between the integer value of each of the set of floating-point coordinates for each of the plurality of primitives. Further, step 1410 may be performed by processing unit 120 in FIG. 1. At least one of the primitive ID or the geometry ID for each of the plurality of primitives may be compressed into 32 bits, and the difference between the integer value of each of the set of floating-point coordinates may be modified to be less than 32 bits.

At 1412, the GPU may store at least one of the compressed primitive ID or the compressed geometry ID for each of the plurality of primitives and the calculated difference between the integer value of each of the set of floating-point coordinates, as described in connection with the examples in FIGS. 1-12. For example, as described in 1260 of FIG. 12, GPU component 1202 may store at least one of the compressed primitive ID or the compressed geometry ID for each of the plurality of primitives and the calculated difference between the integer value of each of the set of floating-point coordinates. Further, step 1412 may be performed by processing unit 120 in FIG. 1. At least one of the compressed primitive ID or the compressed geometry ID for each of the plurality of primitives and the calculated difference between the integer value of each of the set of floating-point coordinates may be stored in a graphics memory (GMEM) or a system memory.

At 1414, the GPU may retrieve at least one of the compressed primitive ID, the compressed geometry ID, or the calculated difference after storing at least one of the compressed primitive ID, the compressed geometry ID, or the calculated difference, as described in connection with the examples in FIGS. 1-12. For example, as described in 1270 of FIG. 12, GPU component 1202 may retrieve at least one of the compressed primitive ID, the compressed geometry ID, or the calculated difference after storing at least one of the compressed primitive ID, the compressed geometry ID, or the calculated difference. Further, step 1414 may be performed by processing unit 120 in FIG. 1.

At 1416, the GPU may perform a ray intersection for at least one of the plurality of nodes after retrieving at least one of the compressed primitive ID, the compressed geometry ID, or the calculated difference, as described in connection with the examples in FIGS. 1-12. For example, as described in 1280 of FIG. 12, GPU component 1202 may perform a ray intersection for at least one of the plurality of nodes after retrieving at least one of the compressed primitive ID, the compressed geometry ID, or the calculated difference. Further, step 1416 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with at least one of a primitive identifier (ID), a geometry ID, or a set of floating-point coordinates. The apparatus, e.g., processing unit 120, may also include means for compressing at least one of the primitive ID or the geometry ID for each of the plurality of primitives. The apparatus, e.g., processing unit 120, may also include means for converting a binary representation of each of the set of floating-point coordinates for each of the plurality of primitives into an integer value of each of the set of floating-point coordinates for each of the plurality of primitives. The apparatus, e.g., processing unit 120, may also include means for calculating a difference between the integer value of each of the set of floating-point coordinates for each of the plurality of primitives. The apparatus, e.g., processing unit 120, may also include means for storing at least one of the compressed primitive ID or the compressed geometry ID for each of the plurality of primitives and the calculated difference between the integer value of each of the set of floating-point coordinates. The apparatus, e.g., processing unit 120, may also include means for modifying the difference between the integer value of each of the set of floating-point coordinates for each of the plurality of primitives. The apparatus, e.g., processing unit 120, may also include means for retrieving at least one of the compressed primitive ID, the compressed geometry ID, or the calculated difference after storing at least one of the compressed primitive ID, the compressed geometry ID, or the calculated difference. The apparatus, e.g., processing unit 120, may also include means for performing a ray intersection for at least one of the plurality of nodes after retrieving at least one of the compressed primitive ID, the compressed geometry ID, or the calculated difference.

The subject matter described herein may be implemented to realize one or more benefits or advantages. For instance, the described graphics processing techniques may be used by a GPU, a graphics processor, or some other processor that may perform graphics processing to implement the node compression techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize node compression techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: obtain a bounding volume hierarchy (BVH) structure including a plurality of nodes, the BVH structure being associated with geometry data for a plurality of primitives in a scene, each of the plurality of nodes including one or more primitives of the plurality of primitives, and each of the plurality of primitives being associated with at least one of a primitive identifier (ID), a geometry ID, or a set of floating-point coordinates; compress at least one of the primitive ID or the geometry ID for each of the plurality of primitives; convert a binary representation of each of the set of floating-point coordinates for each of the plurality of primitives into an integer value of each of the set of floating-point coordinates for each of the plurality of primitives; calculate a difference between the integer value of each of the set of floating-point coordinates for each of the plurality of primitives; and store at least one of the compressed primitive ID or the compressed geometry ID for each of the plurality of primitives and the calculated difference between the integer value of each of the set of floating-point coordinates.

Aspect 2 is the apparatus of aspect 1, where the at least one processor is further configured to: retrieve at least one of the compressed primitive ID, the compressed geometry ID, or the calculated difference after storing at least one of the compressed primitive ID, the compressed geometry ID, or the calculated difference.

Aspect 3 is the apparatus of any of aspects 1 and 2, where the at least one processor is further configured to: perform a ray intersection for at least one of the plurality of nodes after retrieving at least one of the compressed primitive ID, the compressed geometry ID, or the calculated difference.

Aspect 4 is the apparatus of aspects 1 to 3, where at least one of the converted binary representation of each of the set of floating-point coordinates or the calculated difference between the integer value of each of the set of floating-point coordinates is associated with a compression algorithm.

Aspect 5 is the apparatus of any of aspects 1 to 4, where the compression algorithm adjusts an order of the plurality of primitives or adjusts one or more vertices of each of the plurality of primitives.

Aspect 6 is the apparatus of any of aspects 1 to 5, where the compression algorithm selects a first permutation of the adjusted order of the plurality of primitives or a second permutation of the adjusted one or more vertices of each of the plurality of primitives.

Aspect 7 is the apparatus of any of aspects 1 to 6, where the compression algorithm is associated with a lossy shift of each of the plurality of nodes or each of the plurality of primitives.

Aspect 8 is the apparatus of any of aspects 1 to 7, where at least one of the primitive ID or the geometry ID for each of the plurality of primitives is compressed into a plurality of bits.

Aspect 9 is the apparatus of any of aspects 1 to 8, where the at least one processor is further configured to: modify the difference between the integer value of each of the set of floating-point coordinates for each of the plurality of primitives.

Aspect 10 is the apparatus of any of aspects 1 to 9, where at least one of the primitive ID or the geometry ID for each of the plurality of primitives is compressed into 32 bits, and the difference between the integer value of each of the set of floating-point coordinates is modified to be less than 32 bits.

Aspect 11 is the apparatus of any of aspects 1 to 10, where each of the set of floating-point coordinates for each of the plurality of primitives is associated with an axis aligned bounding box (AABB).

Aspect 12 is the apparatus of any of aspects 1 to 11, where each of the set of floating-point coordinates corresponds to a minimum AABB value or a maximum AABB value.

Aspect 13 is the apparatus of any of aspects 1 to 12, where each of the set of floating-point coordinates for each of the plurality of primitives is associated with a predicted offset for each of the set of floating-point coordinates.

Aspect 14 is the apparatus of any of aspects 1 to 13, where the integer value of each of the set of floating-point coordinates for each of the plurality of primitives is a monotonic integer value.

Aspect 15 is the apparatus of any of aspects 1 to 14, where the calculated difference between the integer value of each of the set of floating-point coordinates is a signed integer difference.

Aspect 16 is the apparatus of any of aspects 1 to 15, where the one or more primitives included in each of the plurality of nodes include: one primitive, two primitives, three primitives, or four primitives.

Aspect 17 is the apparatus of any of aspects 1 to 16, where the BVH structure includes a plurality of levels, and each level of the plurality of levels includes at least one node of the plurality of nodes.

Aspect 18 is the apparatus of any of aspects 1 to 17, where the plurality of nodes includes a plurality of internal nodes and a plurality of leaf nodes, where the plurality of internal nodes is associated with a plurality of bounding boxes for the plurality of primitives, and where the plurality of leaf nodes is associated with the geometry data for the plurality of primitives.

Aspect 19 is the apparatus of any of aspects 1 to 18, where the BVH structure is a data structure associated with a ray tracing process for the plurality of primitives in the scene, and where the ray tracing process includes a plurality of rays associated with the geometry data for the plurality of primitives.

Aspect 20 is the apparatus of any of aspects 1 to 19, where at least one of the compressed primitive ID or the compressed geometry ID for each of the plurality of primitives and the calculated difference between the integer value of each of the set of floating-point coordinates are stored in a graphics memory (GMEM) or a system memory.

Aspect 21 is the apparatus of any of aspects 1 to 20, where the apparatus is a wireless communication device, further including at least one of an antenna or a transceiver coupled to the at least one processor.

Aspect 22 is a method of graphics processing for implementing any of aspects 1 to 21.

Aspect 23 is an apparatus for graphics processing including means for implementing any of aspects 1 to 21.

Aspect 24 is a non-transitory computer-readable medium storing computer executable code, the code when executed by at least one processor causes the at least one processor to implement any of aspects 1 to 21.

What is claimed is:

1. An apparatus for graphics processing, comprising:
a memory; and
at least one processor coupled to the memory and configured to:
obtain a bounding volume hierarchy (BVH) structure including a plurality of nodes, the BVH structure being associated with geometry data for a plurality of primitives in a scene, wherein each of the plurality of nodes is associated with one or more primitives of the plurality of primitives, and each of the plurality of nodes comprises a set of floating-point coordinates and at least one of a primitive identifier (ID) or a geometry ID;
compress at least one of the primitive ID or the geometry ID for each of the plurality of primitives into 32 bits,
convert a binary representation of each of the set of floating-point coordinates into a monotonic integer value;
calculate a difference between the monotonic integer value of each of the set of floating-point coordinates and a second monotonic integer value of the set of floating-point coordinates;
modify the difference between the monotonic integer value of at least one of the set of floating-point coordinates to be less than 32 bits; and
store each of the plurality of nodes with at least one of the compressed primitive ID or the compressed geometry ID for each of the plurality of primitives and the difference between the monotonic integer value of each of the set of floating-point coordinates.

2. The apparatus of claim 1, wherein the at least one processor is further configured to:
retrieve at least one of the compressed primitive ID, the compressed geometry ID, or the difference after storing at least one of the compressed primitive ID, the compressed geometry ID, or the difference; and
perform a ray intersection for at least one of the plurality of nodes after retrieving at least one of the compressed primitive ID, the compressed geometry ID, or the difference.

3. The apparatus of claim 1, wherein at least one of the converted binary representation of each of the set of floating-point coordinates or the difference between the monotonic integer value of each of the set of floating-point coordinates is associated with a compression algorithm, wherein the compression algorithm adjusts an order of the plurality of primitives or adjusts one or more vertices of each of the plurality of primitives.

4. The apparatus of claim 3, wherein the compression algorithm is associated with a lossy shift of each of the plurality of nodes or each of the plurality of primitives.

5. The apparatus of claim 1, wherein at least one of the primitive ID or the geometry ID for each of the plurality of primitives is compressed into a plurality of bits.

6. The apparatus of claim 1, wherein each of the set of floating-point coordinates for each of the plurality of primitives is associated with an axis aligned bounding box (AABB).

7. The apparatus of claim 6, wherein each of the set of floating-point coordinates corresponds to a minimum AABB value or a maximum AABB value.

8. The apparatus of claim 1, wherein each of the set of floating-point coordinates for each of the plurality of primitives is associated with a predicted offset for each of the set of floating-point coordinates.

9. The apparatus of claim 1, wherein the difference between the monotonic integer value of each of the set of floating-point coordinates is a signed integer difference.

10. The apparatus of claim 1, wherein the BVH structure includes a plurality of levels, and each level of the plurality of levels includes at least one node of the plurality of nodes.

11. The apparatus of claim 1, wherein the plurality of nodes includes a plurality of internal nodes and a plurality of leaf nodes, wherein the plurality of internal nodes is associated with a plurality of bounding boxes for the plurality of primitives, and wherein the plurality of leaf nodes is associated with the geometry data for the plurality of primitives.

12. The apparatus of claim 1, wherein the BVH structure is a data structure associated with a ray tracing process for the plurality of primitives in the scene, and wherein the ray tracing process includes a plurality of rays associated with the geometry data for the plurality of primitives.

13. The apparatus of claim 1, wherein at least one of the compressed primitive ID or the compressed geometry ID for each of the plurality of primitives and the difference between the monotonic integer value of each of the set of floating-point coordinates are stored in a graphics memory (GMEM) or a system memory.

14. The apparatus of claim 1, wherein the apparatus is a wireless communication device, further comprising at least one of an antenna or a transceiver coupled to the at least one processor.

15. A method of graphics processing, comprising:
obtaining a bounding volume hierarchy (BVH) structure including a plurality of nodes, the BVH structure being associated with geometry data for a plurality of primitives in a scene, wherein each of the plurality of nodes is associated with one or more primitives of the plurality of primitives, and each of the plurality of nodes comprises a set of floating-point coordinates and at least one of a primitive identifier (ID) or a geometry ID;
compressing at least one of the primitive ID or the geometry ID for each of the plurality of primitives into 32 bits;
converting a binary representation of each of the set of floating-point coordinates into a monotonic integer value;
calculating a difference between the monotonic integer value of each of the set of floating-point coordinates and a second monotonic integer value of the set of floating-point coordinates;
modifying the difference between the monotonic integer value of at least one of the set of floating-point coordinates to be less than 32 bits; and
storing each of the plurality of nodes with at least one of the compressed primitive ID or the compressed geometry ID for each of the plurality of primitives and the difference between the monotonic integer value of each of the set of floating-point coordinates.

16. The method of claim 15, further comprising:
retrieving at least one of the compressed primitive ID, the compressed geometry ID, or the difference after storing at least one of the compressed primitive ID, the compressed geometry ID, or the difference; and
performing a ray intersection for at least one of the plurality of nodes after retrieving at least one of the compressed primitive ID, the compressed geometry ID, or the difference.

17. The method of claim 15, wherein at least one of the converted binary representation of each of the set of floating-point coordinates or the difference between the monotonic integer value of each of the set of floating-point coordinates is associated with a compression algorithm, wherein the compression algorithm adjusts an order of the plurality of primitives or adjusts one or more vertices of each of the plurality of primitives.

18. The method of claim 17, wherein the compression algorithm is associated with a lossy shift of each of the plurality of nodes or each of the plurality of primitives.

19. The method of claim 15, wherein at least one of the primitive ID or the geometry ID for each of the plurality of primitives is compressed into a plurality of bits.

20. The method of claim 15, wherein each of the set of floating-point coordinates for each of the plurality of primitives is associated with an axis aligned bounding box (AABB).

21. The method of claim 20, wherein each of the set of floating-point coordinates corresponds to a minimum AABB value or a maximum AABB value.

22. The method of claim 15, wherein each of the set of floating-point coordinates for each of the plurality of primitives is associated with a predicted offset for each of the set of floating-point coordinates.

23. The method of claim 15, wherein the difference between the monotonic integer value of each of the set of floating-point coordinates is a signed integer difference.

24. The method of claim 15, wherein the BVH structure includes a plurality of levels, and each level of the plurality of levels includes at least one node of the plurality of nodes.

25. The method of claim 15, wherein the plurality of nodes includes a plurality of internal nodes and a plurality of leaf nodes, wherein the plurality of internal nodes is associated with a plurality of bounding boxes for the plurality of primitives, and wherein the plurality of leaf nodes is associated with the geometry data for the plurality of primitives.

26. The method of claim 15, wherein the BVH structure is a data structure associated with a ray tracing process for the plurality of primitives in the scene, and wherein the ray tracing process includes a plurality of rays associated with the geometry data for the plurality of primitives.

27. The method of claim 15, wherein at least one of the compressed primitive ID or the compressed geometry ID for each of the plurality of primitives and the difference between the monotonic integer value of each of the set of floating-point coordinates are stored in a graphics memory (GMEM) or a system memory.

28. A non-transitory computer-readable medium storing computer executable code for graphics processing, the code when executed by a processor causes the processor to:
obtain a bounding volume hierarchy (BVH) structure including a plurality of nodes, the BVH structure being associated with geometry data for a plurality of primitives in a scene, wherein each of the plurality of nodes is associated with one or more primitives of the plurality of primitives, and each of the plurality of nodes comprises a set of floating-point coordinates and at least one of a primitive identifier (ID) or a geometry ID;
compress at least one of the primitive ID or the geometry ID for each of the plurality of primitives into 32 bits;
convert a binary representation of each of the set of floating-point coordinates into a monotonic integer value;
calculate a difference between the monotonic integer value of each of the set of floating-point coordinates and a second monotonic integer value of the set of floating-point coordinates;
modify the difference between the monotonic integer value of at least one of the set of floating-point coordinates to be less than 32 bits; and
store each of the plurality of nodes with at least one of the compressed primitive ID or the compressed geometry ID for each of the plurality of primitives and the difference between the monotonic integer value of each of the set of floating-point coordinates.

* * * * *